United States Patent
Cooke et al.

(10) Patent No.: US 8,126,250 B2
(45) Date of Patent: Feb. 28, 2012

(54) IMAGE ACQUIRING APPARATUS, IMAGE ACQUIRING METHOD, AND IMAGE ACQUIRING PROGRAM

(75) Inventors: Jeremy Cooke, Welwyn Garden City (GB); Takayuki Inoue, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 1155 days.

(21) Appl. No.: 11/477,802

(22) Filed: Jun. 30, 2006

(65) Prior Publication Data

US 2007/0206096 A1    Sep. 6, 2007

(30) Foreign Application Priority Data

Mar. 1, 2006    (JP) ................. P2006-055456

(51) Int. Cl.
*G06K 9/00* (2006.01)
(52) U.S. Cl. ....................................................... 382/133
(58) Field of Classification Search .................... 382/133
See application file for complete search history.

(56) References Cited

U.S. PATENT DOCUMENTS

| | | | | |
|---|---|---|---|---|
| 4,367,915 A * | 1/1983 | Georges | ........................ | 359/385 |
| 6,049,421 A | 4/2000 | Raz et al. | | |
| 6,272,235 B1 | 8/2001 | Bacus et al. | ................... | 382/133 |
| 6,308,750 B1 * | 10/2001 | Burke | ........................... | 141/130 |
| 6,396,941 B1 | 5/2002 | Bacus et al. | ................... | 382/128 |
| 6,522,774 B1 | 2/2003 | Bacus et al. | ................... | 382/133 |
| 6,674,881 B2 | 1/2004 | Bacus et al. | ................... | 382/128 |
| 6,674,884 B2 | 1/2004 | Bacus et al. | ................... | 382/133 |
| 6,711,283 B1 | 3/2004 | Soenksen | ..................... | 382/133 |
| 6,816,606 B2 | 11/2004 | Wetzel et al. | ................. | 382/128 |
| 6,847,729 B1 | 1/2005 | Clinch et al. | .................. | 382/128 |
| 6,917,696 B2 | 7/2005 | Soenksen | ..................... | 382/128 |
| 2003/0231791 A1 * | 12/2003 | Torre-Bueno et al. | ........ | 382/133 |
| 2004/0184678 A1 | 9/2004 | Maddison | ..................... | 382/291 |
| 2005/0105174 A1 | 5/2005 | Ogihara et al. | | |
| 2005/0190437 A1 | 9/2005 | Nakagawa | | |

FOREIGN PATENT DOCUMENTS

| | | |
|---|---|---|
| JP | 2003-248176 A | 9/2003 |
| JP | 2004-191959 A | 7/2004 |
| WO | WO9844446 * | 10/1998 |
| WO | WO9844446 A1 * | 10/1998 |
| WO | 01/84209 | 11/2001 |
| WO | 03/012518 | 2/2003 |

* cited by examiner

*Primary Examiner* — Brian Werner
*Assistant Examiner* — Nirav G Patel
(74) *Attorney, Agent, or Firm* — Drinker Biddle & Reath LLP

(57) ABSTRACT

A semi-automatic mode according to which an operator makes a necessary confirmation when an image pickup condition for a micro image is set with reference to a macro image is provided in controlling the acquisition of the macro image, the setting of the image pickup condition, and the acquisition of the micro image with respect to each of a plurality of samples S stored in a sample storage unit 11, and in the semi-automatic mode, the sample S whose macro image has been acquired by a macro image acquiring unit 20 is placed at a standby position without being moved directly to an image acquiring position for a micro image acquiring unit 30. According to this structure, image acquisition with respect to each of the samples S can be efficiently performed, and an operational burden imposed on the operator is reduced. Accordingly, it becomes possible to realize an image acquiring apparatus, an image acquiring method, and an image acquiring program each of which is capable of performing image acquisition with respect to each of the samples with high efficiency.

13 Claims, 13 Drawing Sheets

Fig.3
(a)
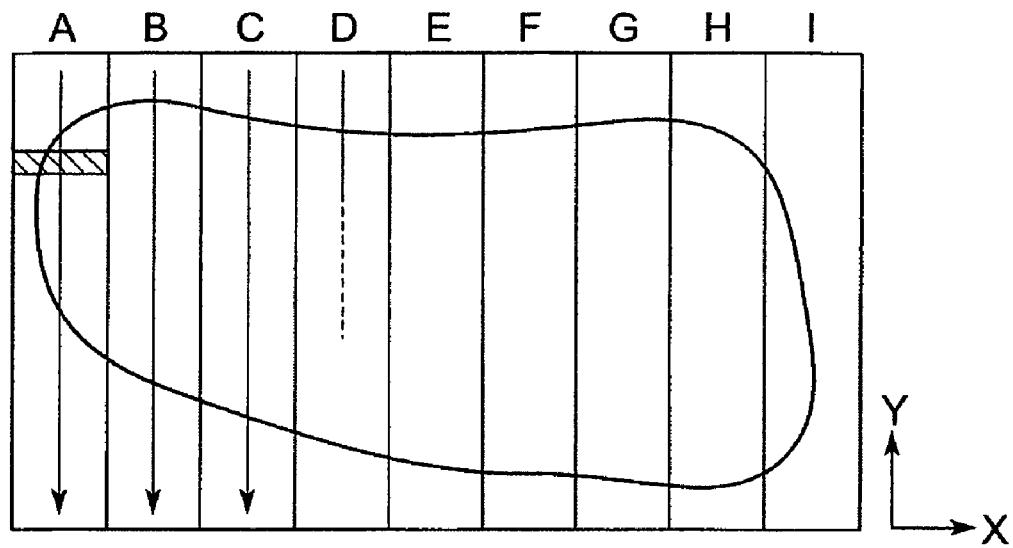
(b)
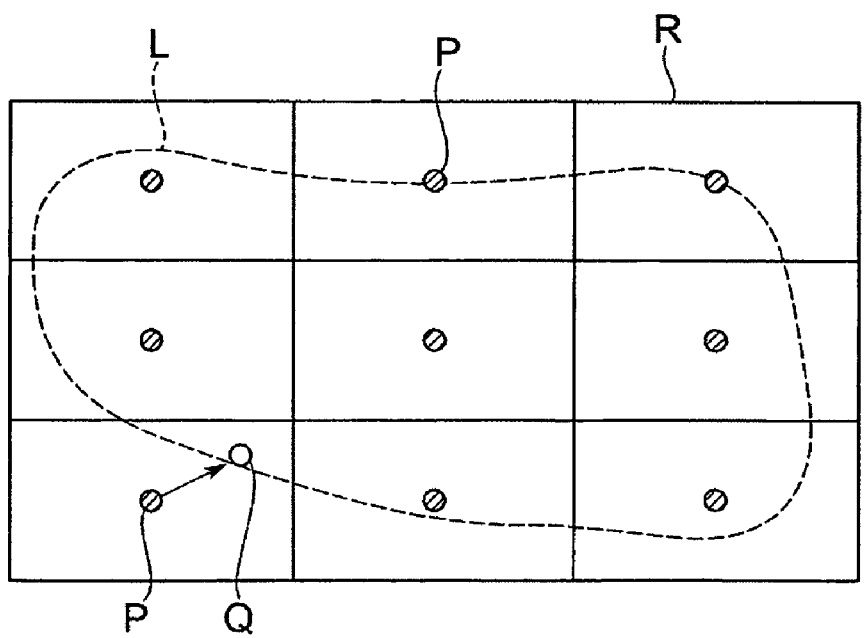

IMAGE ACQUIRING APPARATUS, IMAGE ACQUIRING METHOD, AND IMAGE ACQUIRING PROGRAM

BACKGROUND OF THE INVENTION

1. Field of the Invention

The present invention relates to an image acquiring apparatus, an image acquiring method, and an image acquiring program for acquiring images of a sample.

2. Related Background Art

Recently, in the field of pathology, etc., there are known virtual microscopes which can be operated as if an operator operates a sample through a real microscope in a virtual space of a personal computer or the like. Sample data to be handled in such a virtual microscope is based on image data of a sample acquired in advance by using a real microscope at high resolution.

For realizing image operation in the virtual microscope, it is demanded that an image acquiring apparatus which acquires image data of a sample to be thus used in a virtual microscope acquires an image of a sample at sufficiently high resolution. To efficiently acquire the image with high resolution, a structure in which an image of a sample is acquired by using a camera for macroscopic image acquisition and a camera for microscopic image acquisition at high resolution is described in Document 1: U.S. Pat. No. 6,816,606.

SUMMARY OF THE INVENTION

In the structure including a macro camera and a micro camera as described above, for example, a method is considered in which a macro image is acquired first by the macro camera, an image pickup condition for the sample is set with reference to the macro image, and then, a micro image is acquired by the micro camera with reference to the set image pickup condition. To acquire sample image data for use in a virtual microscope, there is a case in which many slides in each of which a biological sample or the like is sealed in a slide glass are prepared as samples, and an image acquiring operation is continuously performed with respect to the slides. In this case, according to the above structure, a macro image acquiring operation and a micro image acquiring operation must be repeatedly performed with respect to the samples.

In the image acquisition of such a plurality of samples, if an image pickup condition using a macro image is automatically set, the acquisition of a macro image, the setting of an image pickup condition, and the acquisition of a micro image with respect to each sample can be automatically performed in sequence. However, according to this method, a case will arise in which, for example, dust, in addition to a biological sample, in the slide makes it impossible to correctly set an image pickup condition for the slide and to acquire a normal micro image. On the other hand, according to the method in which the setting of an image pickup condition for each sample is manually performed, an operator must pay constant attention to the image acquiring apparatus until image acquisition with respect to each of the samples is completed, and hence an operational burden imposed on the operator is increased.

The present invention has been made to solve these problems, and it is therefore an object of the present invention to provide an image acquiring apparatus, an image acquiring method, and an image acquiring program each of which is capable of performing image acquisition with respect to a plurality of samples with high efficiency.

In order to achieve the above object, an image acquiring apparatus according to the present invention includes (1) sample storage means for storing a plurality of samples, (2) macro image acquiring means for acquiring a macro image of the sample, (3) micro image acquiring means for acquiring a micro image while scanning the sample with higher resolution than that of the macro image, and (4) control means including macro image acquisition control means for controlling an operation to acquire the macro image by the macro image acquiring means, image pickup condition setting means for setting an image pickup condition for the micro image with reference to the macro image, and micro image acquisition control means for controlling an operation to acquire the micro image by the micro image acquiring means, wherein (5) the control means has a semi-automatic mode serving as a control mode, and (6) in the semi-automatic mode, the macro image acquisition control means performs control to place each of the samples from a storage position in the sample storage means at an image acquiring position for the macro image acquiring means so as to acquire the macro image, and then performs control to place the sample at a standby position; the image pickup condition setting means sets the image pickup condition for the micro image while allowing an operator to confirm the macro image and the corresponding image pickup condition with respect to the sample the macro image of which has been acquired; and the micro image acquisition control means performs control to place the sample from the standby position and for which the image pickup condition has been set at an image acquiring position for the micro image acquiring means, and performs control to acquire the micro image with reference to the image pickup condition.

In addition, an image acquiring method according to the present invention (1) uses a plurality of samples stored in sample storage means as objects, and includes (2) a macro image acquiring step of acquiring a macro image of the sample, (3) a micro image acquiring step of acquiring a micro image while scanning the sample with higher resolution than that of the macro image, and (4) a control step including a macro image acquisition control step of controlling an operation to acquire the macro image by the macro image acquiring step, an image pickup condition setting step of setting an image pickup condition for the micro image with reference to the macro image, and a micro image acquisition control step of controlling an operation to acquire the micro image by the micro image acquiring step, wherein (5) the control step has a semi-automatic mode serving as a control mode, and (6) in the semi-automatic mode, the macro image acquisition control step performs control to place each of the samples from a storage position in the sample storage means at an image acquiring position for the macro image acquiring step so as to acquire the macro image, and then performs control to place the sample at a standby position; the image pickup condition setting step sets the image pickup condition for the micro image while allowing an operator to confirm the macro image and the corresponding image pickup condition with respect to the sample the macro image of which has been acquired; and the micro image acquisition control step performs control to place the sample from the standby position and for which the image pickup condition has been set at an image acquiring position for the micro image acquiring step, and performs control to acquire the micro image with reference to the image pickup condition.

Furthermore, an image acquiring program according to the present invention, is applied to an image acquiring apparatus including (1) sample storage means for storing a plurality of samples, (2) macro image acquiring means for acquiring a macro image of the sample, and (3) micro image acquiring means for acquiring a micro image while scanning the sample with higher resolution than that of the macro image, and includes (4) a control processing including a macro image acquisition control processing for controlling an operation to acquire the macro image by the macro image acquiring means; an image pickup condition setting processing for setting an image pickup condition for the micro image with reference to the macro image; and a micro image acquisition control processing for controlling an operation to acquire the micro image by the micro image acquiring means, wherein (5) the control processing has a semi-automatic mode serving as a control mode, and (6) in the semi-automatic mode, the macro image acquisition control processing performs control to place each of the samples from a storage position in the sample storage means at an image acquiring position for the macro image acquiring means so as to acquire the macro image, and then performs control to place the sample at a standby position; the image pickup condition setting processing sets the image pickup condition for the micro image while allowing an operator to confirm the macro image and the corresponding image pickup condition with respect to the sample the macro image of which has been acquired; and the micro image acquisition control processing performs control to place the sample from the standby position and for which the image pickup condition has been set at an image acquiring position for the micro image acquiring means, and performs control to acquire the micro image with reference to the image pickup condition, and wherein the control processing is executed by a computer.

In the image acquiring apparatus, the image acquiring method, and the image acquiring program mentioned above, the macro image acquiring means and the micro image acquiring means are provided for a plurality of samples each of which is an object whose image is acquired, and an image pickup condition is set while referring to a macro image showing the whole of the sample, and then a high-resolution micro image is acquired. Therefore, a high-resolution micro image of the sample that is used as sample image data for use in, for example, a virtual microscope can be suitably acquired.

Additionally, a semi-automatic mode in which an operator makes a necessary confirmation when an image pickup condition for a micro image is set with reference to a macro image is provided as a control mode that controls the acquisition of a macro image, the setting of an image pickup condition, and the acquisition of a micro image with respect to each sample. Therefore, even if there is an unnecessary object, such as dust, in a slide used as a sample, an influence from such an unnecessary object can be reliably excluded, and an image pickup condition for a sample can be correctly set.

Additionally, in the semi-automatic mode mentioned above, a sample whose macro image has been acquired by the macro image acquiring means is placed at a standby position without being moved directly to an image acquiring position in the micro image acquiring means. According to this structure, the acquisition of a macro image of the sample and the setting of an image pickup condition using a macro image can be performed independently of the acquisition of a micro image in which a certain amount of time is taken to acquire a high-resolution image. Therefore, after having set an image pickup condition for the sample, the operator has no need to pay constant attention to the image acquiring apparatus until the acquisition of the micro image is completed, and hence an operational burden imposed on the operator can be lightened.

Concerning the standby position of a sample after having acquired a macro image, the storage position in the sample storage means may be set as the standby position, and the sample whose macro image has been acquired may be again returned to the storage position. Alternatively, sample standby means capable of putting a plurality of samples on standby may be provided independently of the sample storage means.

According to the image acquiring apparatus, the image acquiring method, and the image acquiring program of the present invention, in controlling the acquisition of a macro image, the setting of an image pickup condition, and the acquisition of a micro image with respect to each of a plurality of samples, a semi-automatic mode is provided in which an operator makes a necessary confirmation when an image pickup condition for a micro image is set with reference to a macro image, and additionally, a sample whose macro image has been acquired is placed at a standby position without being moved directly to an image acquiring position for the micro image acquiring means; therefore, image acquisition with respect to each of a plurality of samples can be performed with high efficiency.

BRIEF DESCRIPTION OF THE DRAWINGS

FIG. 3 is a figure with schematic views showing a method for acquiring a sample image.

DESCRIPTION OF THE PREFERRED EMBODIMENTS

Figure 1:
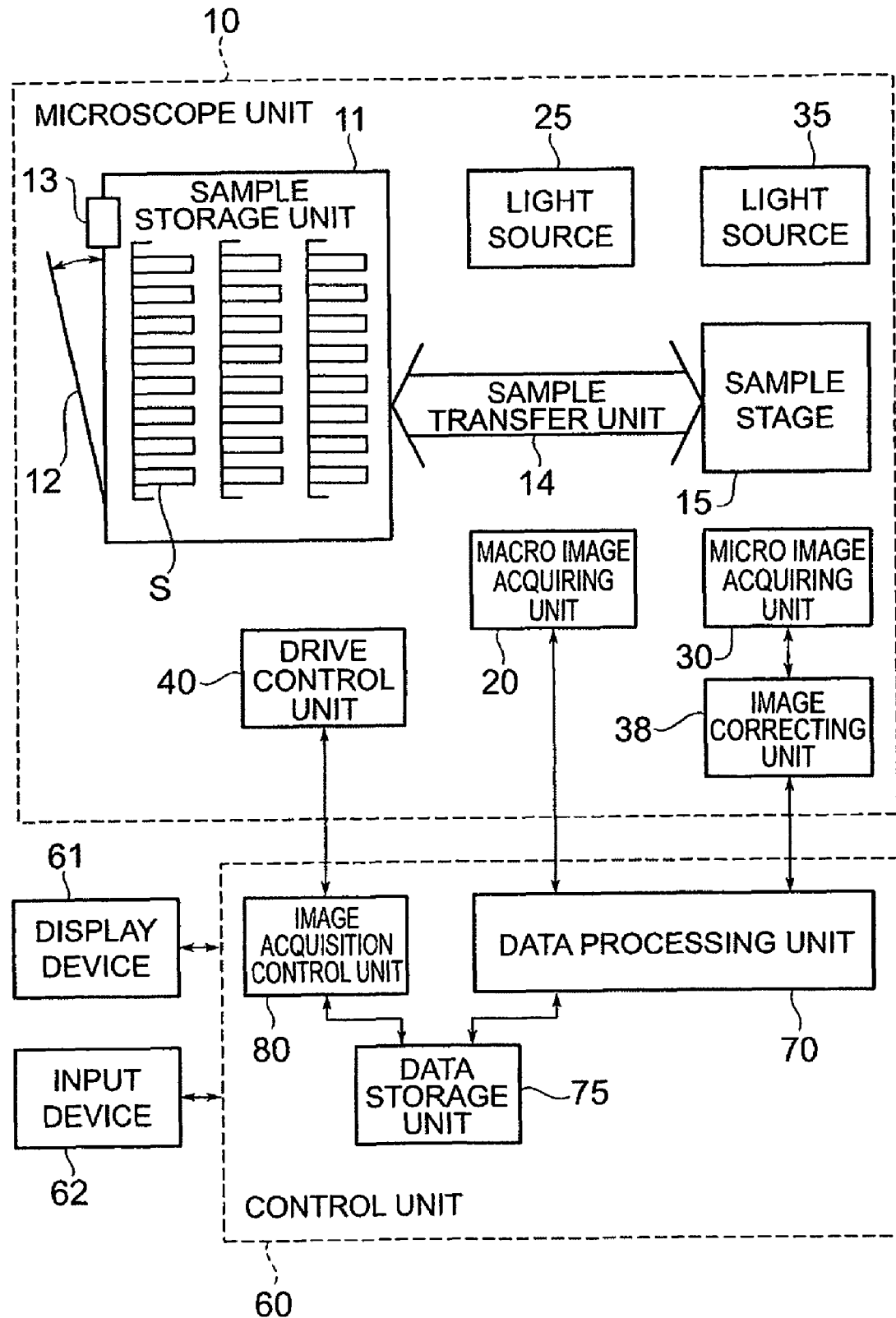
FIG. 1 is a block diagram showing a structure of an embodiment of an image acquiring apparatus.

Hereinafter, preferred embodiments of an image acquiring apparatus, an image acquiring method, and an image acquiring program of the invention will be described along with the drawings. In the description of the drawings, the same components are attached with the same reference numerals, and overlapping description will be omitted. The dimensional ratios of the drawings are not always the same as those in the description.

First, an entire structure of an image acquiring apparatus will be described. FIG. 1 is a block diagram showing a structure of an embodiment of an image acquiring apparatus according to the invention. The image acquiring apparatus according to this embodiment is a microscope system used to acquire images of a sample S with high resolution, and is made up of a microscope unit 10 used to acquire images of the sample S and a control unit 60 that controls the microscope unit 10 acquiring the images. A slide (preparation) in which a biological sample, such as a tissue slice, is enclosed in a slide glass when image data to be used in a virtual microscope is acquired can be mentioned as an example of the sample S serving as an object of image acquisition.

The microscope unit 10 includes a sample storage unit 11, a macro image acquiring unit 20, and a micro image acquiring unit 30. The sample storage unit 11 is storage means structured so as to store a plurality of samples (for example, a plurality of slides containing biological samples sealed, respectively) S as objects of image acquisition. In this sample storage unit 11, a door 12 to be used by an operator to store and extract a sample S is provided. In this embodiment, an interlock mechanism 13 for preventing the door 12 from being opened by mistake during image acquisition is attached.

The macro image acquiring unit 20 is first image acquiring means for acquiring a macro image as a low-magnification image of a sample S. This image acquiring unit 20 acquires a macro image at low resolution corresponding to a whole image of a sample S. A macro light source 25 is disposed to supply light, which is used to produce an optical image of the sample S when macro images are acquired, for the macro image acquiring unit 20.

On the other hand, the micro image acquiring unit 30 is second image acquiring means for acquiring a micro image as a high-magnification image of a sample S. In this image acquiring unit 30, a micro image with high resolution of a target sample S is acquired. A micro light source 35 is disposed to supply light, which is used to produce an optical image of the sample S when micro images are acquired, for the micro image acquiring unit 30. Additionally, as shown in FIG. 1, an image correcting unit 38 is disposed to make necessary corrections to image data concerning micro images acquired by the image acquiring unit 30. A dark correction, a shading correction, etc., can be mentioned as corrections performed by the image correcting unit 38. For example, a shading correction can be performed in such a way that a blank image obtained by imaging a reference sample, such as a slide on which no biological sample is placed, is pre-acquired, and then a shading correction is performed while referring to this blank image. Macro images may be corrected in the same way.

As sample moving means for moving a sample S among positions in the microscope unit 10, a sample transfer unit 14 and a sample stage 15 are provided. The sample transfer unit 14 is transferring means for transferring a sample S between a storage position in the sample storage unit 11 and each of the image acquiring positions for the macro image acquiring unit 20 and the micro image acquiring unit 30. The sample stage 15 carries a sample S placed thereon when acquiring a macro image or a micro image, and is used for setting and adjusting an image acquiring position of the sample S. The microscope unit 10 includes a drive control unit 40 that controllably drives each unit provided in the microscope unit 10.

The control unit 60 includes a data processing unit 70, a data storage unit 75, and an image acquisition control unit 80. Image data of macro images acquired by the macro image acquiring unit 20 and image data of micro images acquired by the micro image acquiring unit 30 are input into the data processing unit 70, and these image data undergo necessary data processing.

The image acquisition control unit 80 controls an operation to acquire an image of the sample S in the microscope unit 10 via the drive control unit 40. Image data input into the data processing unit 70, various data and information obtained by image data processing, or pieces of control information used in the image acquisition control unit 80 are stored and kept in the data storage unit 75 according to need.

The control unit 60 is formed of a computer that includes, for example, a CPU and necessary storage devices, such as memories and hard disks. A display device 61 and an input device 62 are connected to the control unit 60. The display device 61 is, for example, a CRT display or a liquid crystal display, and is used to display an operation screen necessary to operate the image acquiring apparatus or to display an acquired image of the sample S. The input device 62 is, for example, a keyboard or a mouse, and is used to input information necessary for image acquisition or to input instructions for an image acquiring operation.

Figure 2:
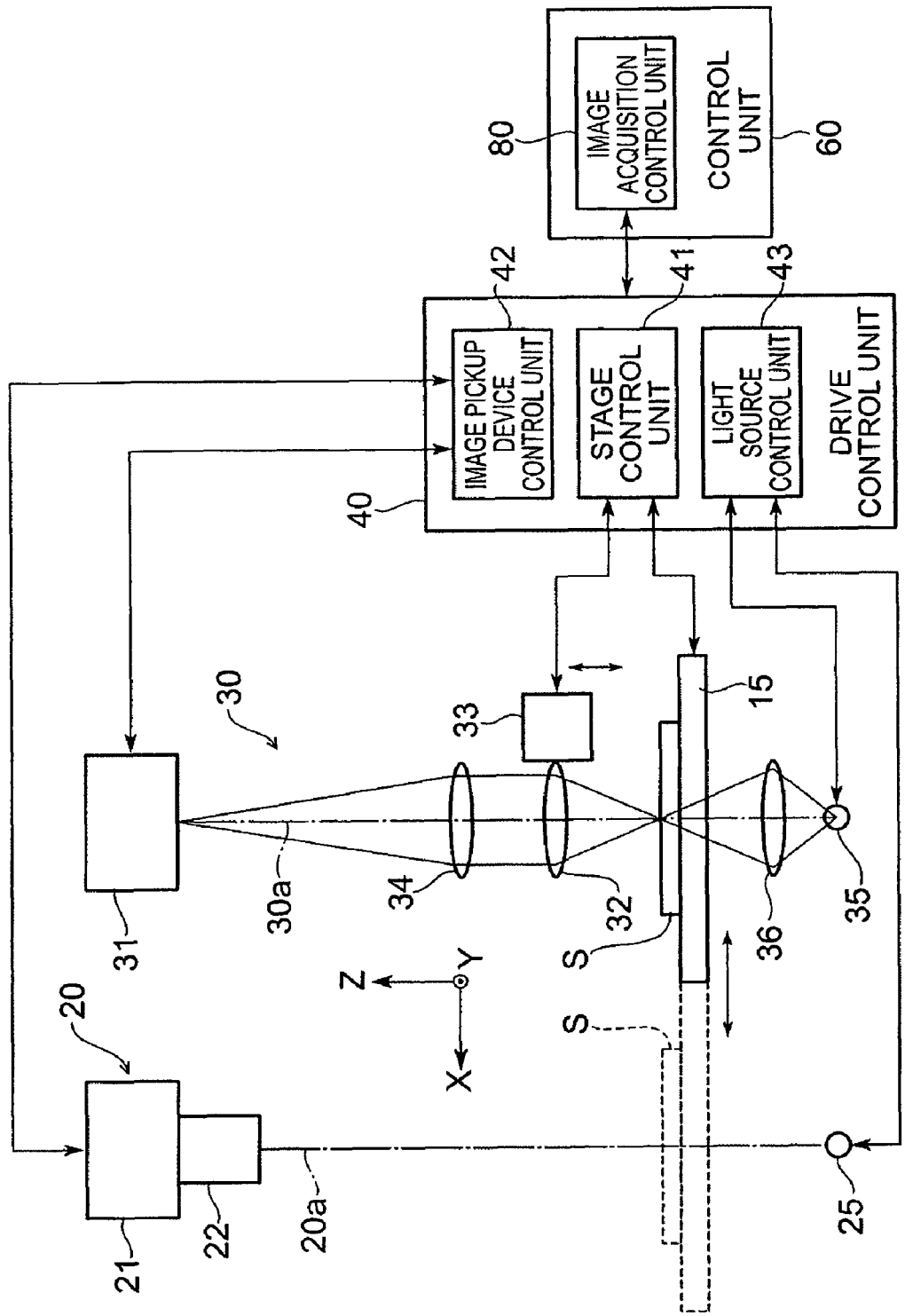
FIG. 2 is a schematic view showing a structure of a microscope unit of the image acquiring apparatus.

Next, a description will be given of a structure of the microscope unit 10 of the image acquiring apparatus shown in FIG. 1. FIG. 2 is a schematic view of the structure of the microscope unit 10. As shown in FIG. 2, the microscope unit 10 according to this embodiment is formed as a transmission type microscope system used to acquire an optical image of a sample S. Herein, two directions perpendicular to each other in a horizontal direction are defined as an X-axis direction and a Y-axis direction, respectively, and a vertical direction perpendicular to the horizontal direction is defined as a Z-axis direction, as shown in the figure. Among these directions, the Z-axis direction, i.e., the vertical direction is that of an optical axis for image acquisition in this microscope system. In FIG. 2, the structure of the macro image acquiring unit 20 and the structure of the micro image acquiring unit 30 are mainly shown, and the sample storage unit 11, the sample transfer unit 14, etc., are not shown.

The sample S is placed on the sample stage 15 at the time of image acquisition in the image acquiring unit 20 or 30. This sample stage 15 is structured as an XY stage movable in the X-axis direction and the Y-axis direction by using a stepping motor, a DC motor, or a servo motor. With this structure, by driving the sample stage 15 within the XY plane, the image acquiring position for the image acquiring unit or 30 with respect to the sample S is set and adjusted. In this embodiment, this sample stage 15 is movable between an image acquiring position for the macro image acquiring unit 20 and an image acquiring position for the micro image acquiring unit 30.

The macro image acquiring unit 20 and the macro light source are provided at respective predetermined positions on an optical axis 20a, with respect to the macro image acquiring position to acquire a macro image of the sample S. The macro light source 25 is a light source from which light used to produce an optical image for macro image acquisition is projected onto the sample S, and is disposed under the sample stage 15.

The macro image acquiring unit 20 is configured by using an image pickup device 21, such as a two-dimensional CCD sensor, that is capable of acquiring a two-dimensional image by the optical image of the sample S. An image pickup optical system 22 serving as an optical system that guides the optical image of the sample S is disposed between the macro image acquiring position at which the sample S is placed and the image pickup device 21.

On the other hand, the micro image acquiring unit 30 and the micro light source 35 are provided at respective predetermined positions on an optical axis 30a, with respect to the micro image acquiring position to acquire a micro image of the sample S. The micro light source 35 is a light source from which light used to produce an optical image for micro image acquisition is projected onto the sample S, and is, together with a condensing lens 36, disposed under the sample stage 15.

The micro image acquiring unit 30 is configured by using an image pickup device 31, such as a one-dimensional CCD sensor, that is capable of acquiring a one-dimensional image by the optical image of the sample S. An objective lens 32 and a light guide optical system 34, serving as an optical system that guides the optical image of the sample S, are disposed between the micro image acquiring position at which the sample S is placed and the image pickup device 31. The objective lens 32 produces an optical image of the sample S by entering light that has been transmitted through the sample S thereinto. The light guide optical system 34 is formed of, for example, a tube lens, and guides the optical image of the sample S to the image pickup device 31.

With respect to the objective lens 32, a Z stage 33 using a stepping motor or a piezo-actuator is provided, and by driving the objective lens 32 in the Z-axis direction by this Z stage 33, focusing on the sample S can be performed. As the image pickup device 31 in this micro image acquiring unit 30, an image pickup device capable of acquiring a two-dimensional image and TDI driving can also be used as well as the image pickup device capable of acquiring a one-dimensional image.

As this micro image acquiring image pickup device 31, for example, an image pickup device such as a 3-CCD camera capable of acquiring a color image is preferably used. As the macro image acquiring image pickup device 21, either a monochrome image acquiring image pickup device or an image pickup device capable of acquiring a color image can be used as appropriate. As the image pickup device 31, when acquisition of a color image is not necessary, a monochrome image acquiring image pickup device can also be used.

The drive control unit 40 includes a stage control unit 41, an image pickup device control unit 42, and a light source control unit 43 which are provided for the sample stage 15, the macro image acquiring unit 20, the micro image acquiring unit 30, the light sources 25 and 35. The stage control unit 41 controllably drives the sample stage 15, which is an XY stage, and a Z stage 33 so as to set and adjust image pickup conditions concerning the sample S. The image pickup device control unit 42 controllably drives the image pickup devices 21 and 31 so as to control the image acquisition of the sample S. The light source control unit 43 controllably drives the light sources 25 and 35 so as to control the projection of light used for the image acquisition of the sample S. Concerning the control of each unit of the microscope unit 10, another structure may be used so that each unit is controlled directly by the image acquisition control unit 80 of the control unit 60 without using the drive control unit 40.

Herein, acquisition of the macro image and the micro image of the sample S in the image acquiring units 20 and 30 will be described. In the macro image acquiring unit 20, a macro image as a whole image of the sample S to be used for setting an image pickup condition of a micro image is acquired. For example, if a slide in which a biological sample or the like is enclosed in a slide glass as mentioned above is used as the sample S, an image of the whole of the slide or an image of a predetermined range including the biological sample is acquired as the macro image.

In the micro image acquiring unit 30, a micro image of the sample S at target resolution is acquired with reference to the set image pickup condition. This micro image acquisition is performed by two-dimensionally scanning the sample S at a predetermined resolution higher than that of the macro image as schematically shown in FIG. 3(a). Herein, in the micro image acquisition using the image pickup device 31 such as a one-dimensional CCD camera, in an XY plane parallel to the sample S, the longitudinal direction of an image pickup plane of the image pickup device 31 is defined as an X-axis direction, and a direction orthogonal to this longitudinal direction is defined as a Y-axis direction. In this case, in the micro image acquisition, the direction orthogonal to the longitudinal direction of the image pickup plane in the image pickup device 31, that is, the negative direction of the Y axis in FIG. 3(a) is the direction to scan the sample S.

In the micro image acquisition using the image pickup device 31 such as a one-dimensional CCD camera, first, the sample S on the sample stage 15 is scanned in the scanning direction (negative direction of the Y axis) by the image pickup device 31 to acquire a strip-like partial image A with the desired resolution. Furthermore, as shown in FIG. 3(a), a plurality of partial images A, B, . . . , I are acquired by repeating a plurality of times this partial image acquisition while changing the image pickup position along the longitudinal direction (positive direction of the X axis) of the image pickup plane.

By arranging partial images A through I thus obtained in the X-axis direction and combining these, the whole micro image of the sample S can be generated. By such a micro image acquiring method, it is possible to preferably acquire image data of the sample S at sufficiently high resolution. In FIG. 3(a), the hatched region in the partial image A, whose longitudinal direction is along the X-axis direction, shows an image pickup region corresponding to the image pickup plane in the image pickup device 31.

For setting of the image pickup condition of a micro image, it is preferable that an image acquiring range and focus measuring position are set as image pickup conditions of a micro image with reference to the macro image acquired by the image pickup device 21 of the macro image acquiring unit 20. As a result, from information obtained by a macro image that is the whole image of the sample S, it becomes possible to suitably set parameters used for micro image acquisition and to acquire sample image data being in an excellent state and having high resolution.

In detail, when a slide is set as a sample S as described above, as shown in FIG. 3(b), the image acquiring range with respect to the sample S can be set to a rectangular range R including a biological sample L in the slide as an object of image acquisition. Two-dimensional scanning of the sample S in the micro image acquiring unit 30 (see FIG. 3(a)) is performed within the image acquiring range R thus set. When the image acquiring range R is automatically set, for example, it is possible to employ a method in which a range in which an object (for example, a biological sample L) whose image is acquired exists is determined, by binarizing an image with reference to a threshold that has been set with respect to the brightness pattern in a macro image, and, based on a determination result, the image acquiring range R is set.

Figure 4:
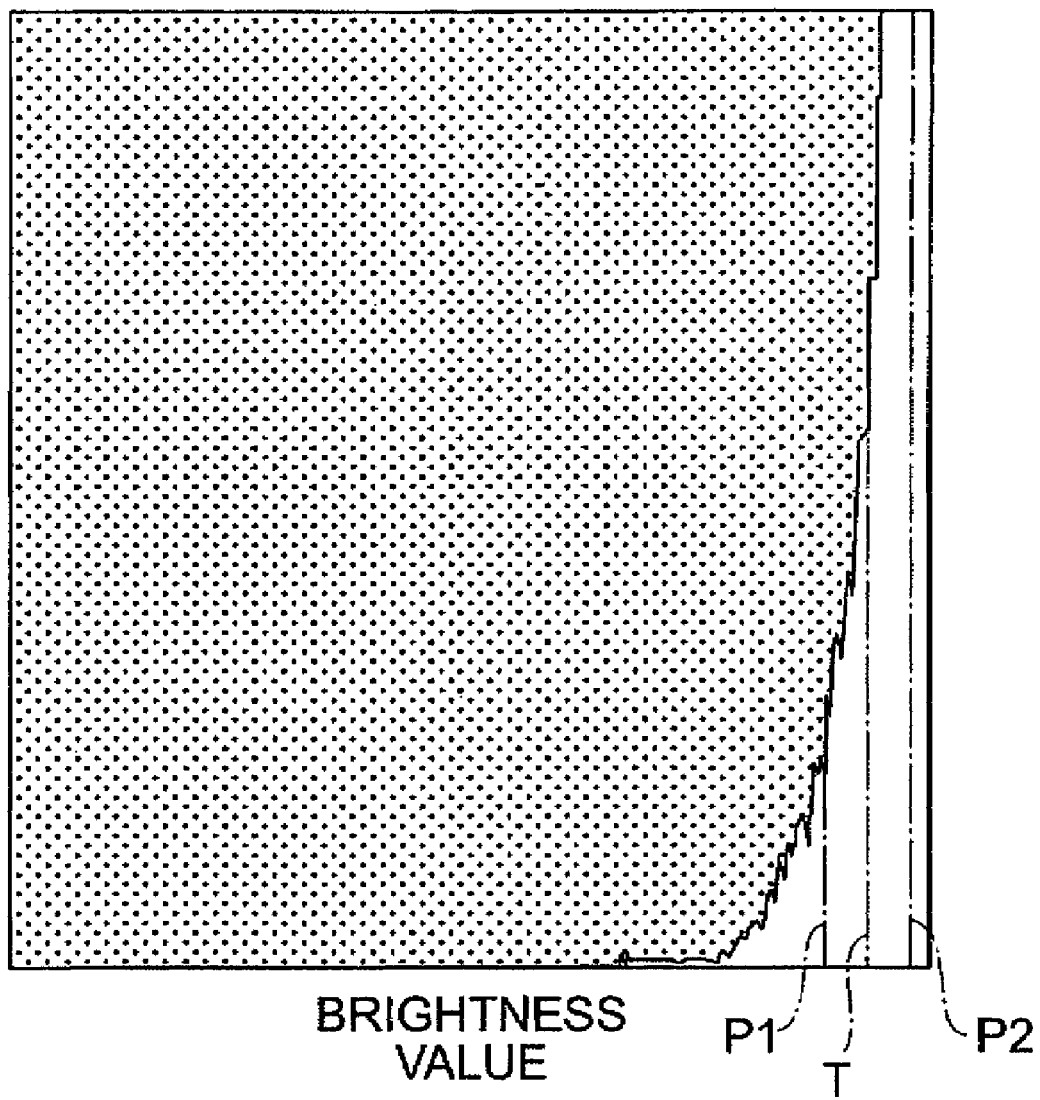
FIG. 4 is a graph showing a method for setting a threshold to binarize a macro image.

FIG. 4 is a graph showing a method for setting a threshold to binarize a macro image. In the graph of FIG. 4, the abscissa axis represents the brightness value in each pixel of a macro image. In the macro image acquired in this embodiment, a region in which only a slide glass is provided without a biological sample L has the highest brightness resulting from the optically transmissible structure of the macro image acquiring unit 20.

To set a threshold with respect to a macro image, it is possible to employ a method in which two peaks P1 and P2 are found in its brightness distribution, for example, as shown in FIG. 4, and a brightness value at the center therebetween is set as a threshold T. Accordingly, ranges in which objects L exist in the image can be easily determined by binarizing the image according to this threshold. Further, a consecutive range greater than a specified area of the determined ranges is set as a range for one object L, and a minimum, rectangular region containing all of the objects L is set as an image acquiring range R. To set such a threshold, various methods can be employed instead of the above method, for example, a threshold may be set at a predetermined, fixed rate with respect to a brightness value of a peak.

When a range in which an object L exists in a binarized macro image is determined, it is preferable to apply erosion processing (i.e., processing to reduce a pictorial mass) to the binarized image n times, and then apply dilation processing (i.e., processing to enlarge a pictorial mass) to the image n times. As a result, for example, small noises in the image can be removed. It is permissible to further perform a filtering process to remove an edge of a cover glass of a slide or dust in the slide.

The focus measuring position is used, in the micro image acquiring unit 30, when acquiring focus information with respect to the sample S prior to acquisition of the micro image of the sample S. In the micro image acquiring unit 30, focus measurement is performed by using the image pickup device 31 at a set focus measuring position to determine a focus position as focus information on acquisition of the micro image of the sample S. Concerning the focus measuring position, for example, when the inclination of the sample S in a horizontal plane, i.e., a deviation in focal position in a horizontal plane is negligible, only one focus measuring position is set for the sample S.

When there is a need to consider a deviation in focal position in the horizontal plane, it is preferable to set three or more focus measuring positions for the sample S. A two-dimensional focus map with respect to the image acquiring range R of the sample S can be obtained by setting three or more focus measuring positions in this way and then performing focus measurement. For example, when the focus map about focal positions is determined as a planar focal plane, the focal plane can be calculated from a plane including measurement result points at the three focus measuring positions. When four or more focus measuring positions are used, a focal plane can be calculated from their measurement result points according to a fitting technique, such as a least-squares method.

FIG. 3(b) shows an example of setting of the focus measuring positions by using a macro image in the case where nine focus measuring positions are automatically set. In this case, the image acquiring range R set in advance for the sample S is equally divided by 3×3=9, and nine focus measuring positions P are set to center points of the respective divided regions.

In this case, eight points of the nine focus measuring positions are initially set points included in the range of the biological sample L as an object of image acquisition, so that they are set as focus measuring positions without change. On the other hand, the lower left point is out of the range of the biological sample L, and it cannot be set as the focus measuring position as it is. Therefore, this lower left focus measuring position may be set to, for example, a position Q determined by a method in which it is moved toward the center of the image acquiring range R. Alternatively, such a position may be excluded from the focus measuring positions.

In the case of determining a focal plane by using the least square method from four or more focus measuring positions, when the focus measuring positions include a measuring position excessively distant from the obtained focal plane, it is preferable that a focal plane is re-determined by excluding this distant measuring position. When the focal plane cannot be normally determined, it is preferable that the object is regarded as dust and excluded.

As in the example described above, when the sample S is a slide, as the image pickup conditions for acquiring a micro image, preferably, first, an image acquiring range R including a biological sample L and a predetermined number of focus measuring positions P are set as the image pickup conditions of a micro image by referring to a macro image acquired by the macro image acquiring unit 20. Thereafter, in the micro image acquiring unit 30, focus information concerning the focal position or the focal plane with respect to the sample S is acquired based on the focus measuring positions P, and the micro image of the sample S is then acquired based on the thus obtained focus information and the set image acquiring range R.

For setting the image acquiring range R and the focus measuring positions P by using the macro image of the sample S, in detail, various methods may be used as well as the example shown in FIG. 3(b). For example, FIG. 3(b) shows an example in which the focus measuring positions P are set automatically by using a predetermined setting algorithm, however, to manually set the focus measuring positions, focus measuring positions with an appropriate number and arrangement may be set after an operator confirms the macro image.

Figure 5:
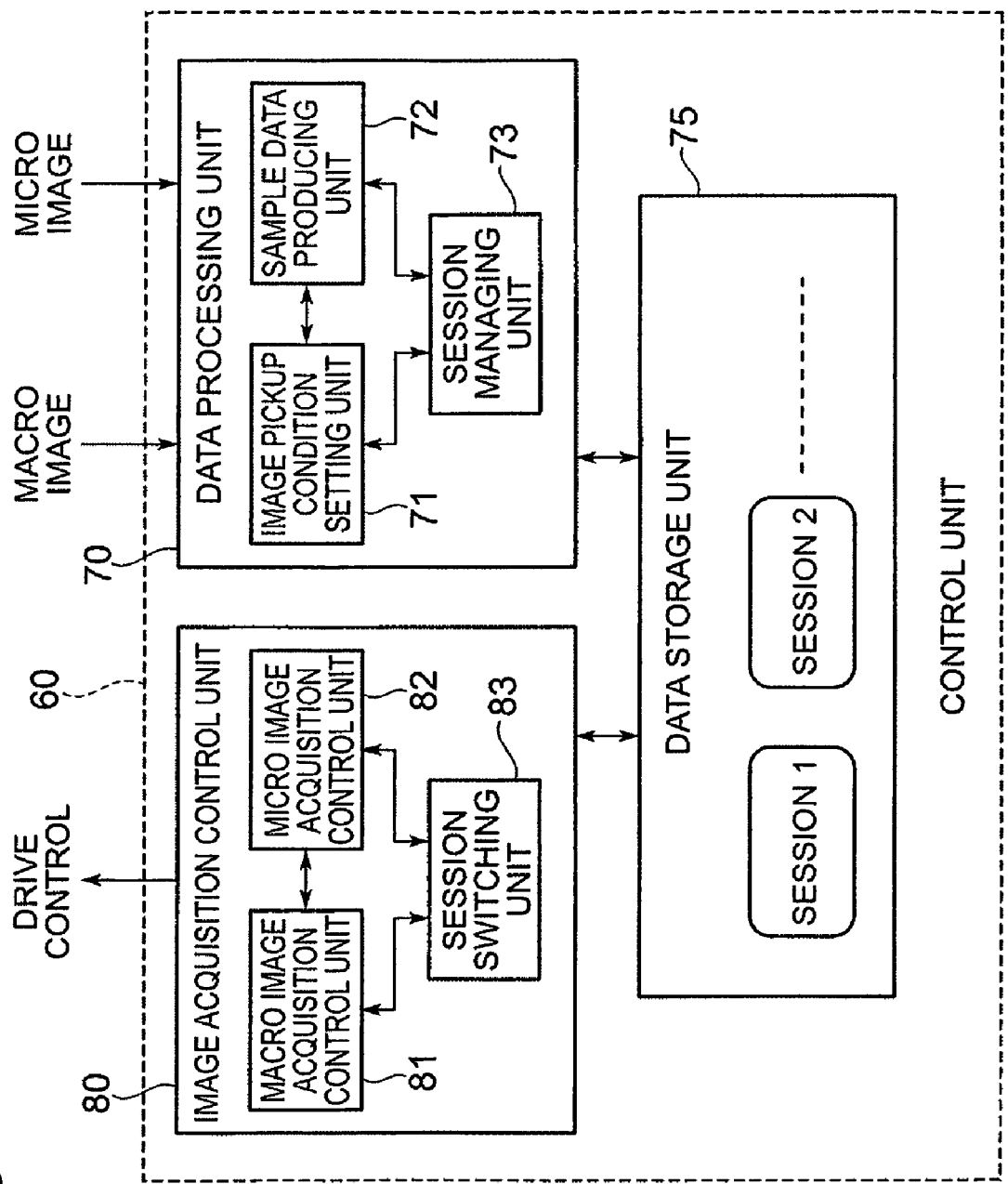
FIG. 5 is a block diagram showing a structure of a control unit of the image acquiring apparatus.

Next, a description will be given of a structure of the control unit 60 of the image acquiring apparatus shown in FIG. 1. FIG. 5 is a block diagram showing the structure of control unit 60. As shown in FIG. 5, the control unit 60 according to this embodiment is made up of the data processing unit 70, the data storage unit 75, and the image acquisition control unit 80.

The data processing unit 70 includes an image pickup condition setting unit 71 and a sample data producing unit 72. The image pickup condition setting unit 71 is setting means for setting image pickup conditions for micro images while referring to the macro image acquired by the macro image acquiring unit 20 of the microscope unit 10. The sample data producing unit 72 produces sample data that is image data concerning the sample S by using the micro image acquired by the micro image acquiring unit 30.

Figure 6:
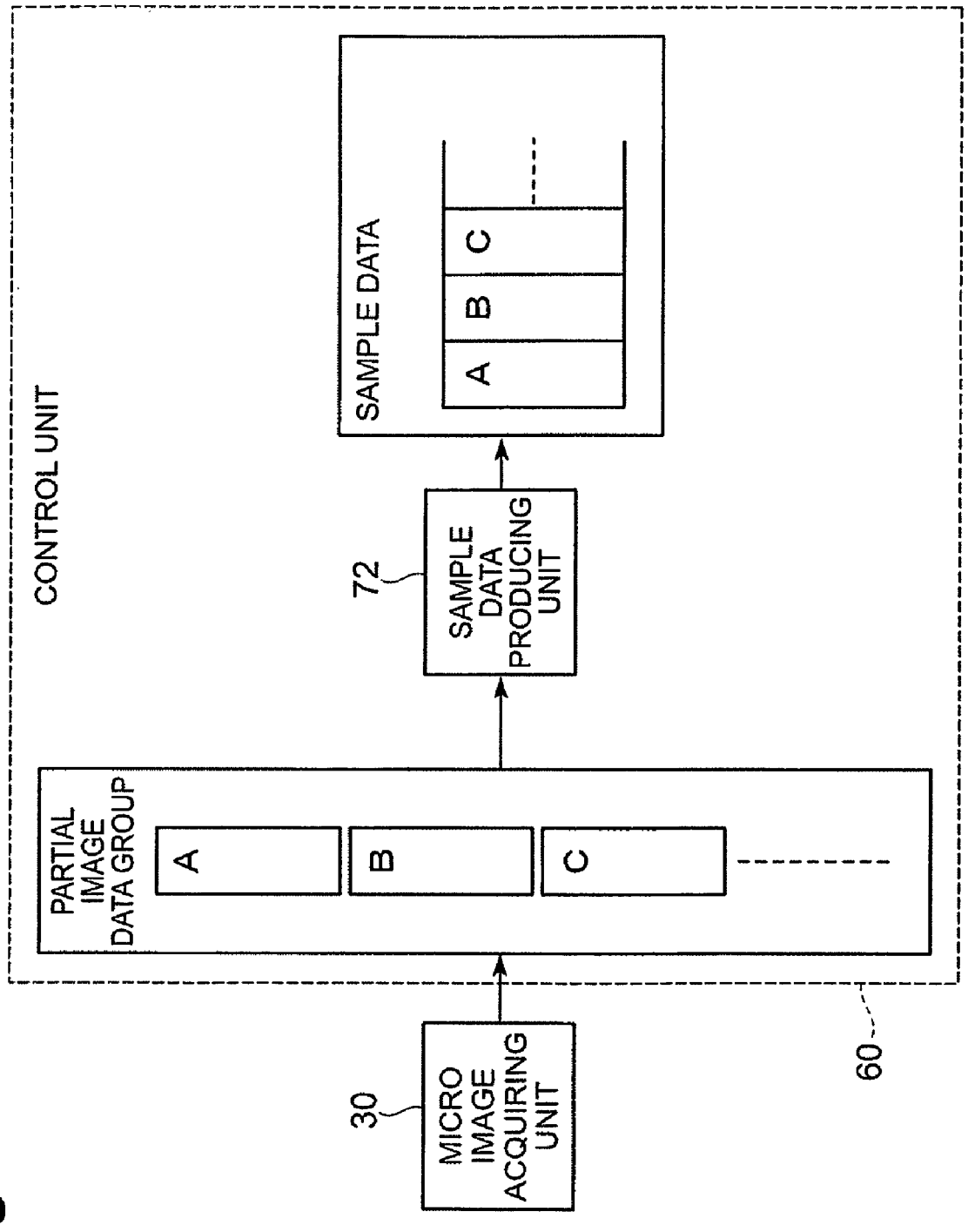
FIG. 6 is a schematic view showing the production of sample data using a micro image.

FIG. 6 is a schematic view for explaining the production of sample data while using micro images. Herein, an image data group consisting of pieces of data concerning strip-like partial images A, B, C, . . . is input to the control unit 60 as image data concerning the micro images acquired by the micro image acquiring unit 30 of the microscope unit 10 (see FIG. 3(a)). The sample data producing unit 72 arranges and combines these partial images together, and produces image data of micro images with respect to the whole of the sample S so as to be sample data. For example, this sample data can be used as image data for the virtual microscope. The image data concerning the sample S may be subjected to data compression according to need. The image data input from the microscope unit 10 and the sample data produced by the sample data producing unit 72 are stored in the data storage unit 75 according to need.

The image acquisition control unit 80 includes a macro image acquisition control unit 81 and a micro image acquisition control unit 82. The macro image acquisition control unit 81 controls an operation to acquire macro images of the sample S by means of the macro image acquiring unit 20. The micro image acquisition control unit 82 controls an operation to acquire micro images by means of the micro image acquiring unit 30. The image acquisition control units 81 and 82 control the acquiring operation of the macro and micro images of the sample S, and the image pickup condition setting unit 71 sets the image pickup condition, according to a control mode selected for the image acquisition processing. In this embodiment, the number of control modes provided in the control unit 60 is three, i.e., a full-automatic mode, a manual mode, and a semi-automatic mode.

Figure 7:
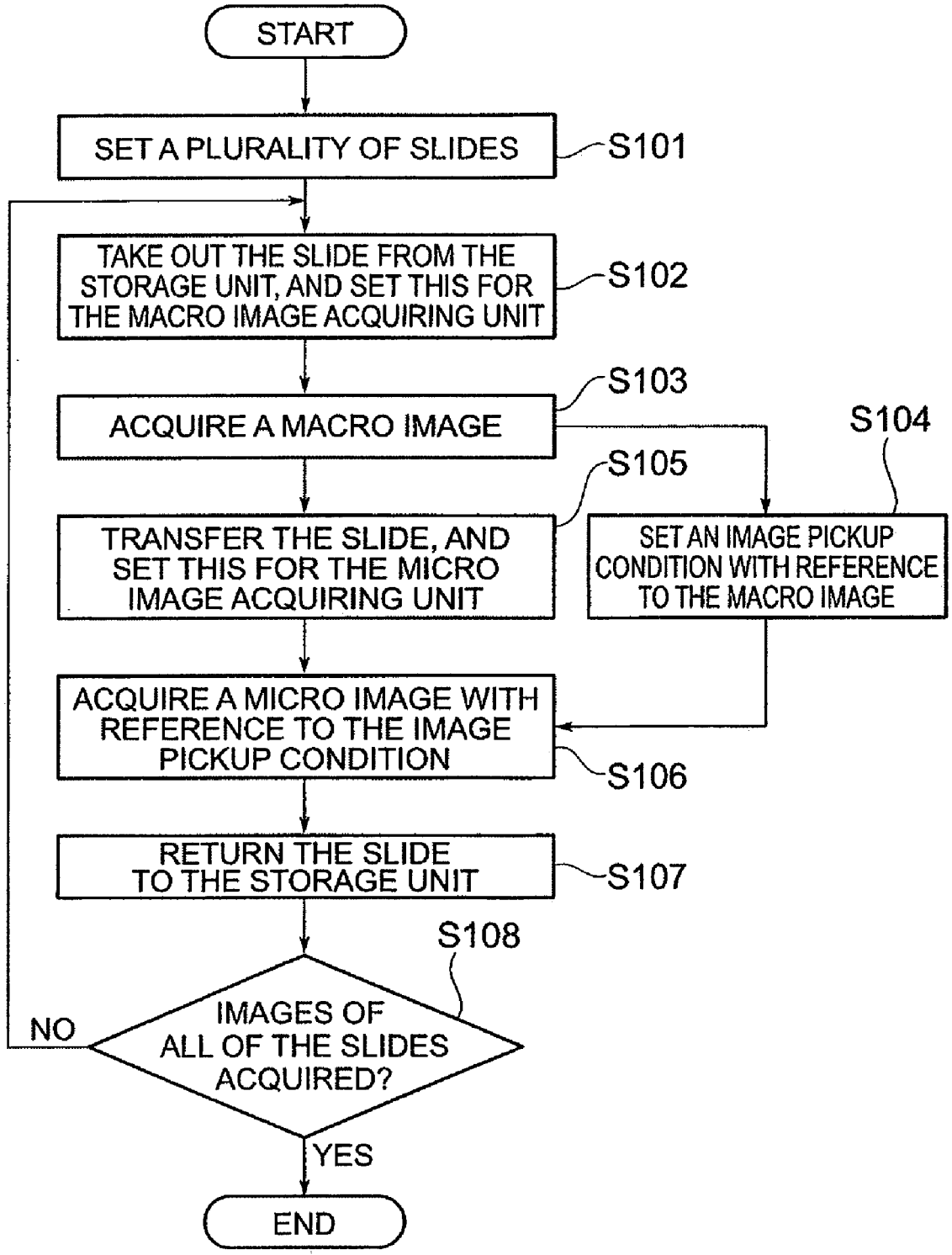
FIG. 7 is a flowchart showing an image acquiring method in a full-automatic mode.

FIG. 7 is a flowchart showing an image acquiring method according to the full-automatic mode. In the full-automatic mode, the macro image acquisition control unit 81 of the control unit 60 performs macro image acquisition control by placing the sample S from a storage position in the sample storage unit 11 at an image acquiring position for the macro image acquiring unit 20 (macro image acquisition control step). With respect to the sample S whose macro image has been acquired, the image pickup condition setting unit 71 automatically sets an image pickup condition for a micro image corresponding to the macro image (image pickup condition setting step). The micro image acquisition control unit 82 performs micro image acquisition control by placing the sample S whose image pickup condition has been set at an image acquiring position for the micro image acquiring unit 30 while referring to the image pickup condition (micro image acquisition control step).

In an example shown in FIG. 7, first, an operator sets a plurality of slides S, which are objects for image acquisition, at the sample storage unit 11 of the microscope unit 10, and then closes a door 12 (step S101). The number of slides that can be stored in the sample storage unit 11 is, for example, several hundred, depending on a specific structure of an apparatus.

Thereafter, one of the slides S that is an object for image acquisition is taken out from the sample storage unit 11, is then transferred by the sample transfer unit 14, placed on the sample stage 15, and is set at the image acquiring position for the macro image acquiring unit 20 (see FIG. 1 and FIG. 2) (S102). Thereafter, the image pickup device 21 of the image acquiring unit 20 acquires a macro image of the slide S including the biological sample L (S103, macro image acquiring step). In the image pickup condition setting unit 71 of the control unit 60, an image acquiring range R and a plurality of focus measuring positions P, which are image pickup conditions for the slide S, are automatically set by use of predetermined algorithm while referring to the macro image acquired above (S104, image pickup condition setting step).

The slide S that has completed the macro image acquisition is moved from the image acquiring position for the macro image acquiring unit 20 by means of the sample transfer unit 14 or the sample stage 15, and is set at an image acquiring position for the micro image acquiring unit 30 (S105). Thereafter, the image pickup device 31 of the image acquiring unit 30 acquires a micro image of the slide S while referring to the image pickup condition set by the image pickup condition setting unit 71 (S106, micro image acquiring step).

In more detail, concerning each of the focus measuring positions P set with respect to the slide S, focus measurement is first performed in the micro image acquiring unit 30, and a focal plane, which serves as focus information most suitable to acquire an image of the biological sample L, is calculated from the obtained focal positions. Based on the focal plane obtained in this way, the slide S is two-dimensionally scanned by the image pickup device 31 with respect to the image acquiring range R while performing focus control, thus acquiring a plurality of strip-like partial images. The partial images are changed into a high-resolution micro image of the slide S (a digital slide in the virtual microscope) by being subjected to predetermined data combine processing by the sample data producing unit 72 of the control unit 60.

Thereafter, the slide S that has completed the micro image acquisition is returned from the image acquiring position for the micro image acquiring unit 30 to the storage position in the sample storage unit 11 by means of the sample transfer unit 14 (S107). Thereafter, in the image acquisition control unit 80, a confirmation is made of whether all of the slides S have undergone the image acquisition processing or not (S108). If there is a slide S to be subjected to the image acquisition processing here, steps S102 to S107 mentioned above are repeatedly performed. If all of the slides S have undergone the image acquisition processing, image acquisition with respect to the slides S set in the sample storage unit 11 is ended.

The image acquisition procedure according to the manual mode is performed basically in the same way as the image acquisition procedure according to the full-automatic mode, except that each step is manually performed under instructions from the operator. However, in the manual mode, it is permissible to automatically perform a step at which instructions from the operator are unnecessary, such as a step at which the slide S that has completed macro image acquisition is moved to the image acquiring position for the micro image acquiring unit 30. Additionally, concerning the acquisition of the micro image of the slide S, it is permissible to form a structure in which the image pickup condition can be reset or a micro image can be re-acquired if a problem occurs by allowing the operator to confirm the micro image acquired above.

Figure 8:
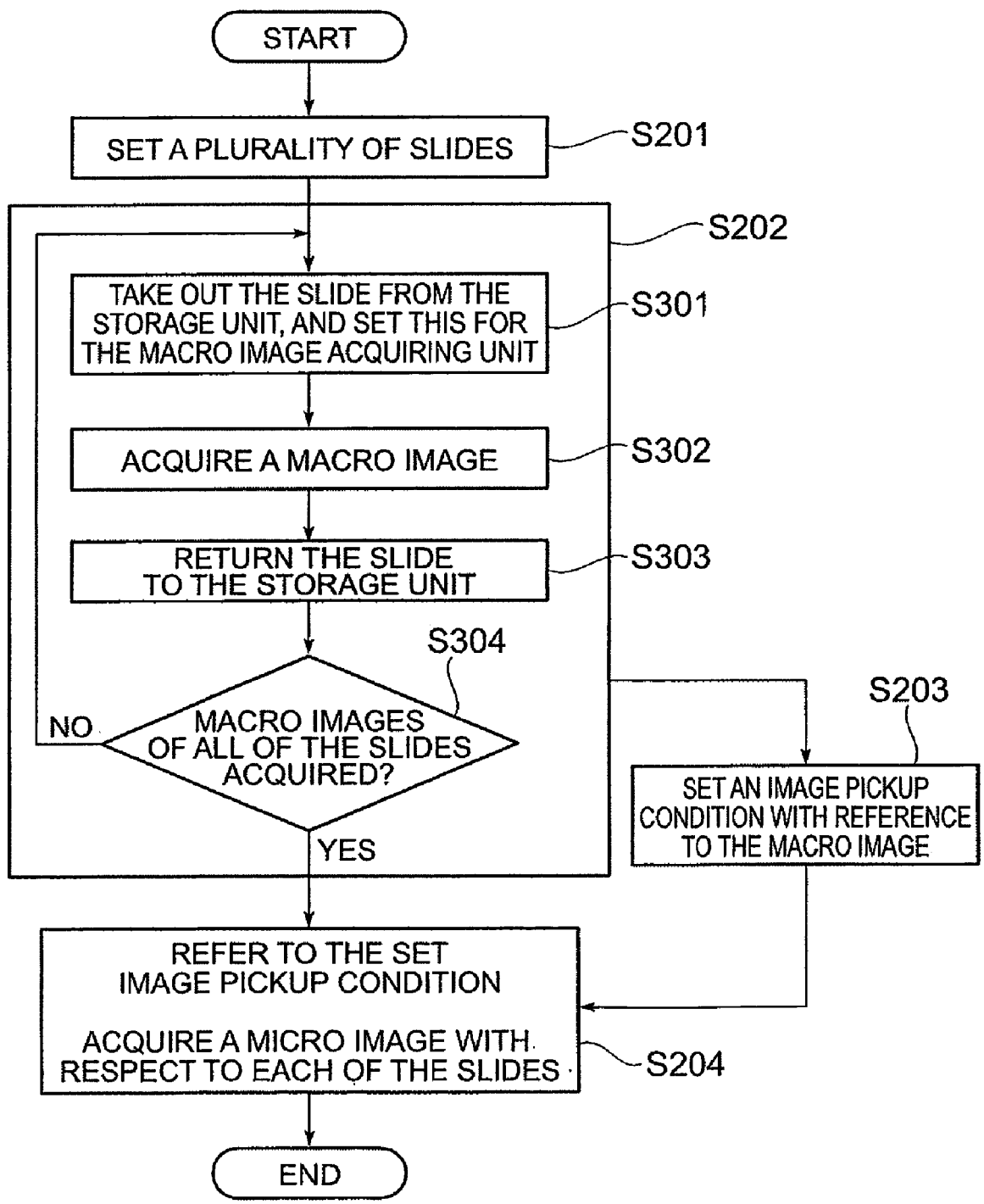
FIG. 8 is a flowchart showing an image acquiring method in a semi-automatic mode.
Figure 9:
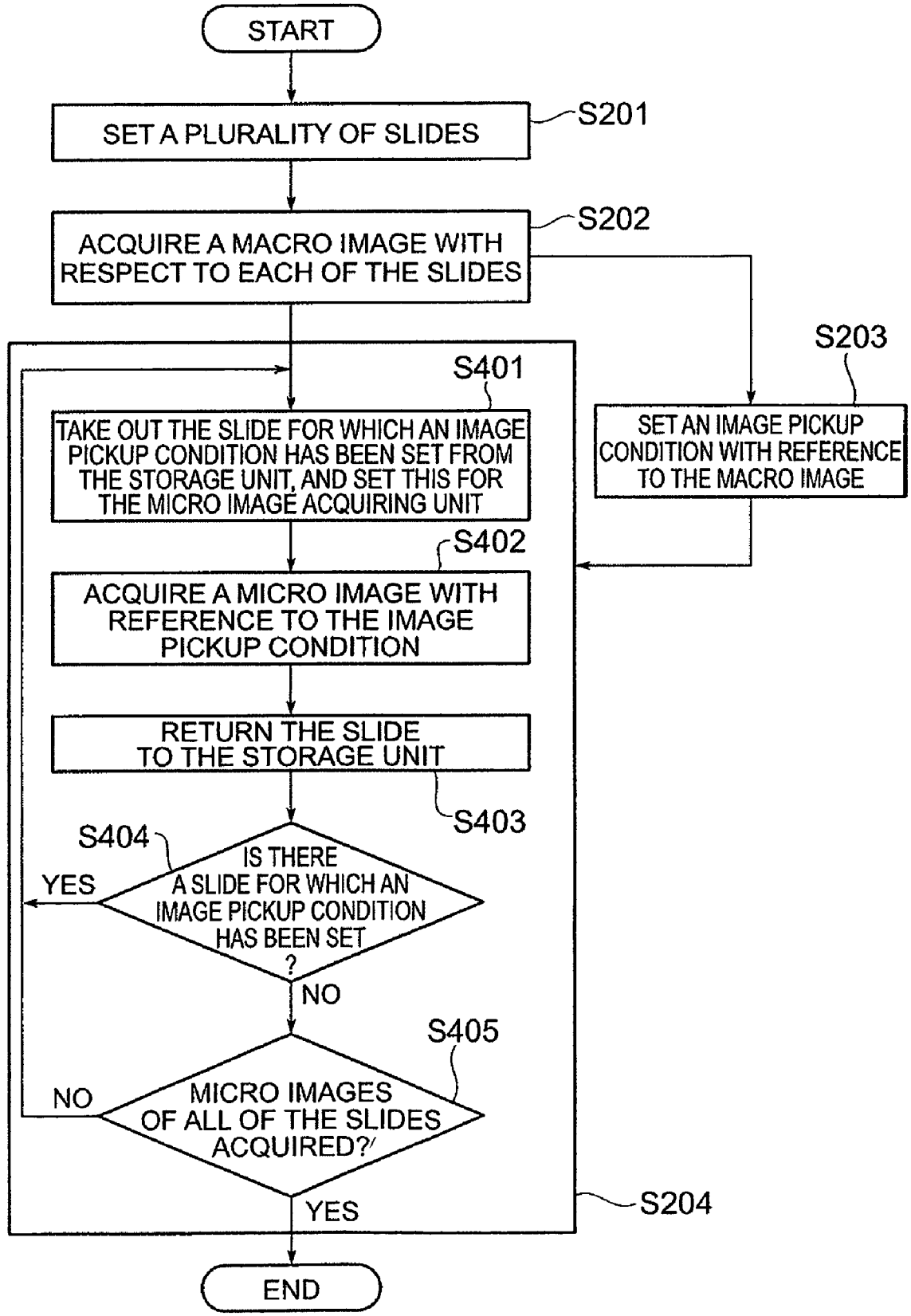
FIG. 9 is a flowchart showing an image acquiring method in a semi-automatic mode.

FIG. 8 and FIG. 9 are flowcharts, each showing an image acquiring method according to a semi-automatic mode. In the semi-automatic mode, the macro image acquisition control unit 81 of the control unit 60 performs control to place each of a plurality of samples S from the storage position in the sample storage unit 11 at an image acquiring position for the macro image acquiring unit 20 so as to acquire a macro image, and then performs control to place the sample S at a standby position (macro image acquisition control step). With respect to the sample S whose macro image has been acquired, the image pickup condition setting unit 71 allows the operator to confirm the macro image and a corresponding image pickup condition, and sets an image pickup condition for a micro image (image pickup condition setting step). The micro image acquisition control unit 82 performs control to place the sample S that has been placed at the standby position and for which the image pickup condition has been set at an image acquiring position for the micro image acquiring unit 30, and performs micro image acquisition control while referring to the image pickup condition (micro image acquiring control step). In this embodiment, the standby position of the sample S is set at the storage position in the sample storage unit 11.

In an example shown in FIG. 8 and FIG. 9, first, the operator sets a plurality of slides S, which are objects for image acquisition, at the sample storage unit 11 of the microscope unit 10 in the same way as in the full-automatic mode, and then closes the door 12 (step S201).

Thereafter, the macro image acquisition control unit 81 performs the acquisition of a macro image of each of the slides S (S202, macro image acquiring step). In more detail, as shown in FIG. 8, one of the slides S that is an object whose image is acquired is taken out from the storage position in the sample storage unit 11, is then transferred by the sample transfer unit 14, placed on the sample stage 15, and is set at an image acquiring position for the macro image acquiring unit 20 (S301). Thereafter, the image pickup device 21 of the image acquiring unit 20 acquires a macro image of the slide S including the biological sample L (S302).

The slide S that has completed the macro image acquisition is returned from the image acquiring position for the macro image acquiring unit 20 to the storage position, which is also its standby position, in the sample storage unit 11 by means of the sample transfer unit 14 (S303). Thereafter, in the macro image acquisition control unit 81, a confirmation is made of whether all of the slides S have undergone the macro image acquisition processing or not (S304). If there is a slide S to be subjected to the macro image acquisition processing here, steps S301 to S303 mentioned above are repeatedly performed. If all of the slides S have undergone the macro image acquisition processing, macro image acquisition with respect to the slides S set in the sample storage unit 11 is ended.

In this mode, after the macro image of the first slide S is acquired, an image pickup condition for a micro image is set in parallel with the macro image acquisition processing (S203, image pickup condition setting step). In the image pickup condition setting unit 71 of the control unit 60, with respect to a slide S that is an object for which an image pickup condition is set, the operator is allowed to confirm the macro image acquired above and a corresponding image pickup condition through display means, thus setting an image acquiring range R and a plurality of focus measuring positions P, which are image pickup conditions to acquire the micro image. A detailed description of the method for setting the image pickup condition here will be given later.

After all of the slides S complete the macro image acquisition processing, the micro image acquisition control unit 82 performs the acquisition of a micro image of each of the slides S in parallel with a process for setting an image pickup condition (S204, micro image acquiring step). In more detail, one of the slides S for which an image pickup condition has already been set is selected from among the slides S, and image acquisition is performed as shown in FIG. 9. The slide S selected therefrom is taken out from the storage position, which is also its standby position in the sample storage unit 11, is then transferred by the sample transfer unit 14, placed on the sample stage 15, and is set at an image acquiring position for the micro image acquiring unit 30 (S401). Thereafter, the image pickup device 31 of the image acquiring unit 30 acquires a micro image of the slide S while referring to the image pickup condition set by the image pickup condition setting unit 71 (S402). The method for acquiring the micro image is carried out basically in the same way as in the full-automatic mode.

Thereafter, the slide S that has completed the micro image acquisition is returned from the image acquiring position for the micro image acquiring unit 30 to the storage position in the sample storage unit 11 by means of the sample transfer unit 14 (S403). Thereafter, in the micro image acquisition control unit 82, a confirmation is made of whether an image pickup condition is to be set for one of the slides S (S404). If there is still a slide S for which an image pickup condition is set and which is subjected to image acquisition processing, steps S401 to S403 mentioned above are repeatedly performed.

If there is not a slide S for which an image pickup condition has been set, in the micro image acquisition control unit 82, a confirmation is further made of whether one of the slides S has already completed undergoing the image acquisition processing or not (S405). If there is a slide S to be further subjected to image acquisition processing here, steps S401 to S403 mentioned above are repeatedly performed while waiting for an image pickup condition to be set. If all of the slides S have completed undergoing the image acquisition processing, image acquisition with respect to the slides S set in the sample storage unit 11 is ended.

In the image acquiring apparatus according to this embodiment, a session is defined in accordance with a plurality of samples S set in the sample storage unit 11 by the operator, and a sample group of samples S and a corresponding data group of macro images, image pickup conditions, micro images, etc., are associated with each other by this session. According to this structure, the control unit 60 shown in FIG. 5 includes a session managing unit 73 provided in the data processing unit 70 and a session switching unit 83 provided in the image acquisition control unit 80.

The session managing unit 73 manages the data group consisting of macro images, image pickup conditions, micro images, etc., in each session, and allows the data storage unit 75 to store the data group if necessary. In the data storage unit 75 of FIG. 5, as an example of the data management, a case is shown in which a data group of a plurality of sessions consisting of session 1, session 2, . . . is stored. The session switching unit 83 controls switching between an image acquisition processing and another image acquisition processing in association with an exchange for a sample group of a plurality of samples S, and gives instructions to the session managing unit 73 to perform switching to a corresponding data group. Thus, the image acquisition processing of the samples S can be suitably controlled, and data corresponding to this can be suitably be managed by associating the sample group of the samples S and the data group in image acquisition with each other by use of the concept of session.

Figure 10:
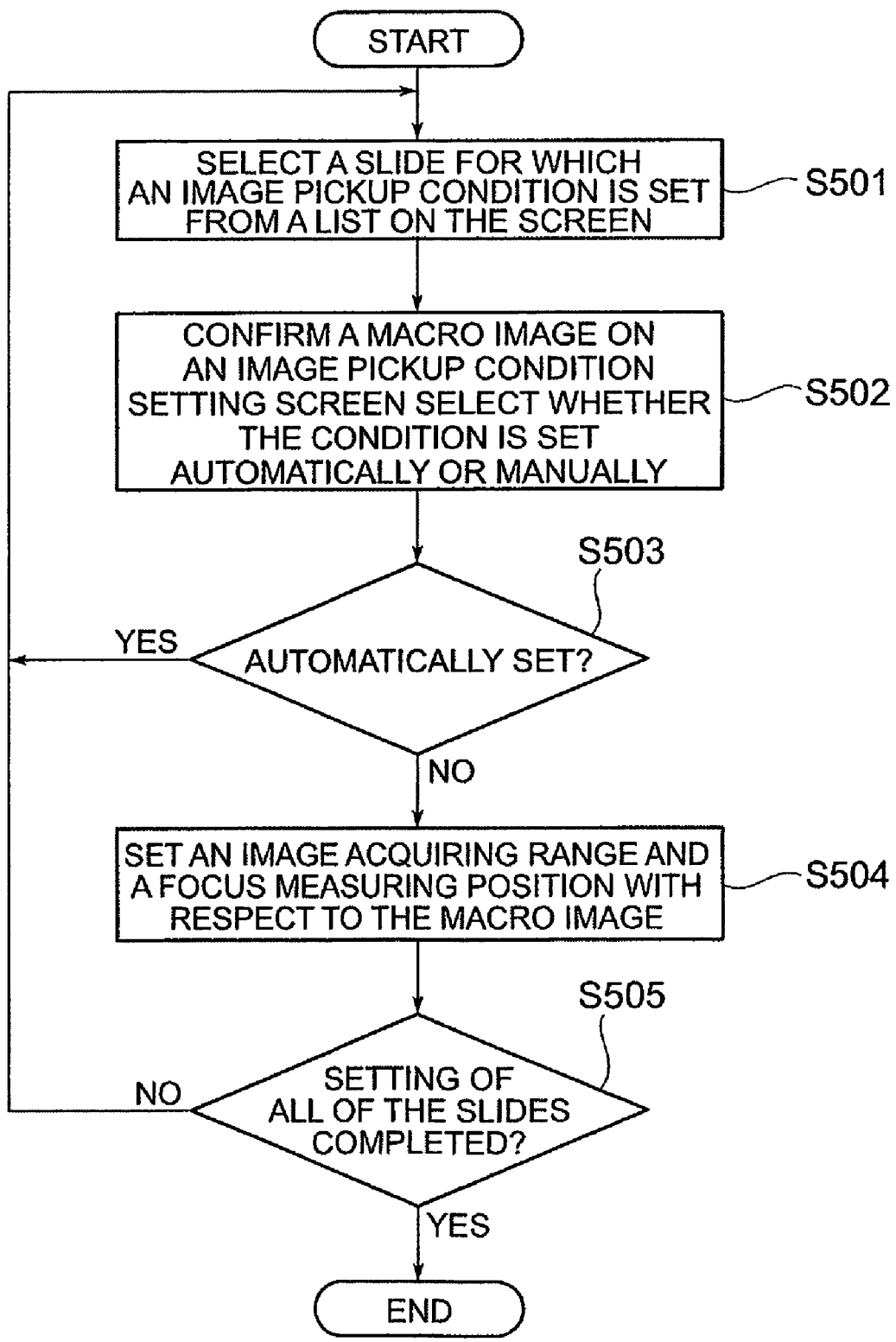
FIG. 10 is a flowchart showing a method for setting an image pickup condition.
Figure 11:
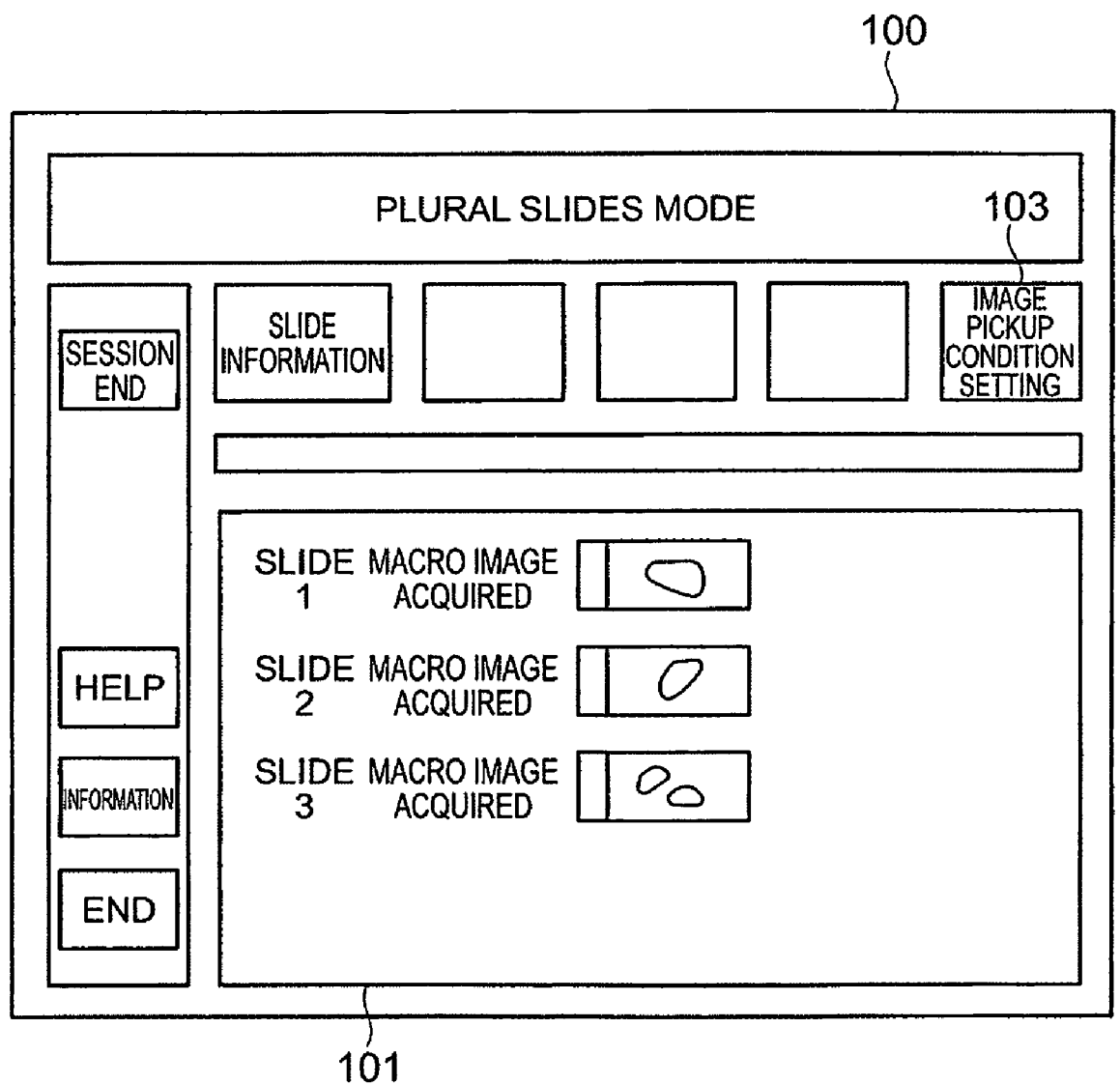
FIG. 11 is a view showing an example of an operation screen used to set an image pickup condition.
Figure 12:
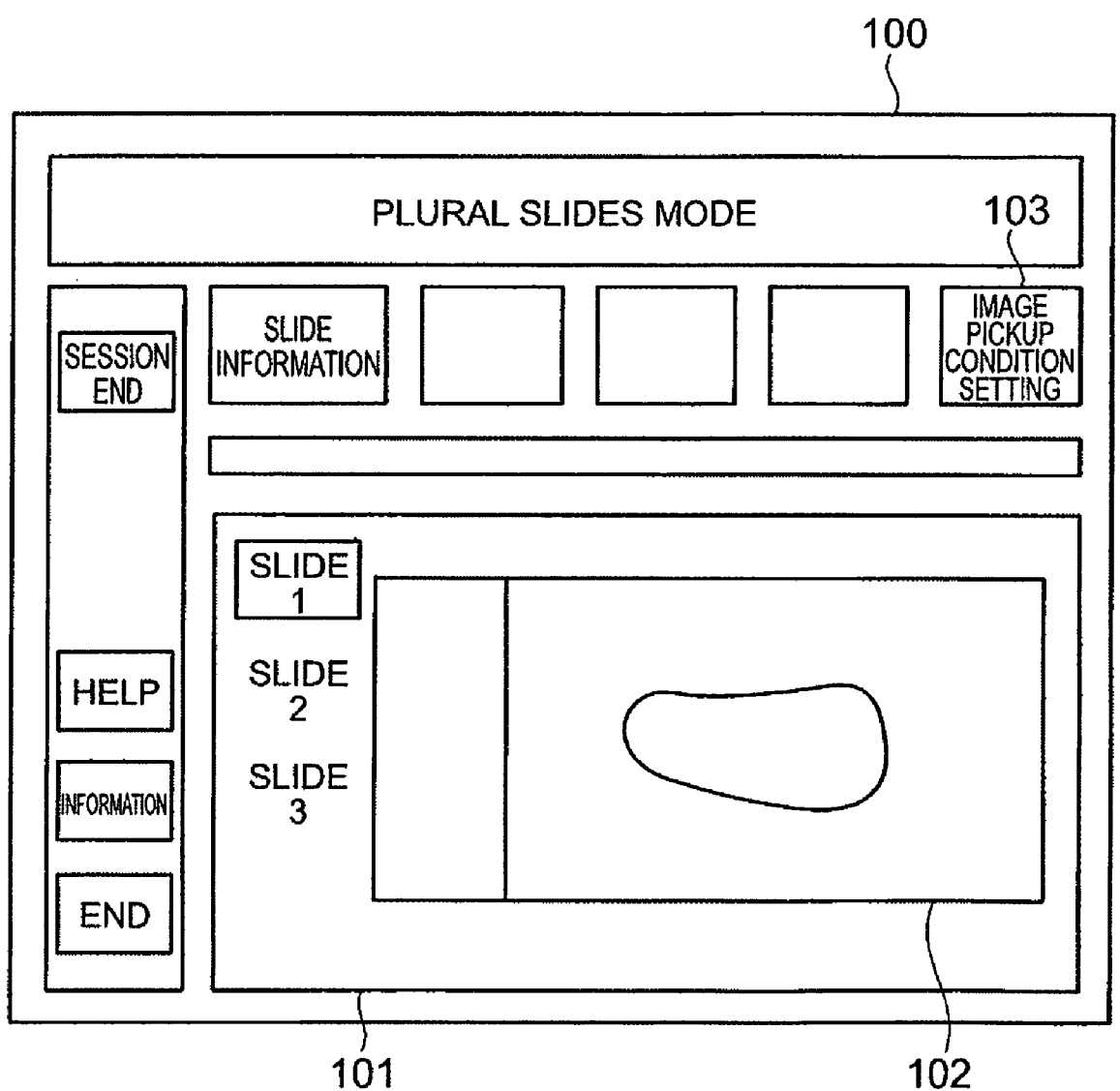
FIG. 12 is a view showing an example of an operation screen used to set an image pickup condition.
Figure 13:
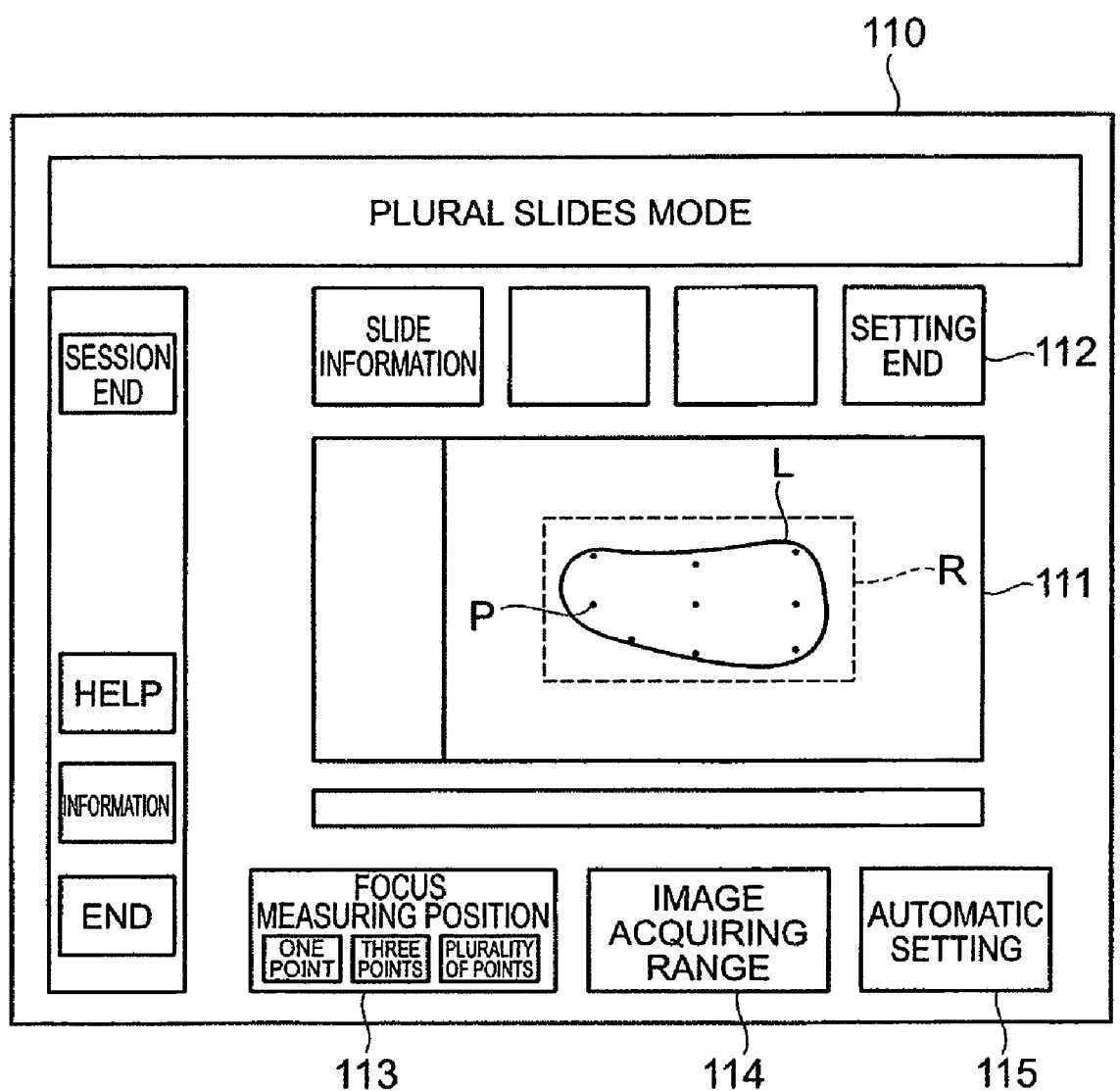
FIG. 13 is a view showing an example of an operation screen used to set an image pickup condition.

A description will be given of a concrete example in which an image pickup condition for a micro image in the semi-automatic mode is set. FIG. 10 is a flowchart showing one example of a method for setting an image pickup condition. FIG. 11 to FIG. 13 show examples of operation screens used to set an image pickup condition. These operation screens are displayed on the display device 61 in the structure of FIG. 1.

An operation screen 100 of FIG. 11 is displayed on the display device 61 in a state in which macro images of one or more of the slides S whose images are to be acquired have been acquired. On the operation screen 100, a list of slides whose macro images have been acquired (i.e., slide 1 to slide 3 in FIG. 11) are displayed in a list display part 101 together with thumbnail images of the corresponding macro images.

When the operator clicks a desired slide name, for example "slide 1", on the screen 100, the operator can see a macro image of "slide 1" selected therefrom that is obtained by being enlarged in a macro image display part 102 as shown in FIG. 12, and can confirm the contents thereof. When an image pickup condition setting button 103 is clicked in this state, a slide to set an image pickup condition is selected from a slide list displayed thereon (step S501).

When the slide to set an image pickup condition is selected, a macro image of slide 1 selected therefrom is displayed in the macro image display part 111 of the image pickup condition setting screen 110 of FIG. 13. The operator confirms this macro image, and determines whether the image pickup condition is set automatically or manually (S502). A confirmation is made of whether automatic setting has been selected or not (S503), and if automatic setting has been selected, the image pickup condition is automatically set, the setting of the image pickup condition with respect to the slide is then ended, and the process proceeds to the subsequent step to select a next slide and to set an image pickup condition.

If manual setting has been selected, the operator manually sets an image acquiring range R and a focus measuring position P with respect to the macro image of the slide in consideration of a range in which the biological sample L exists and its shape (S504). When the setting of the image pickup condition is ended, a confirmation is made of whether all of the slides S have already completed the setting of the image pickup condition or not (S505). If there is still a slide S for which an image pickup condition must be set, steps S501 to S504 mentioned above are repeatedly performed. If the setting of the image pickup condition for all of the slides S is completed, the setting of the image pickup condition for the slides S set in the sample storage unit 11 is ended.

In the example of the image pickup condition setting screen 110 shown in FIG. 13, when a macro image of the slide S is displayed in the macro image display part 111, the image acquiring range R and the focus measuring position P that have been automatically set are first calculated, and the results are displayed on the macro image as default values for the image pickup condition. The operator confirms the automatically set image pickup condition displayed here, and selects whether to set the image pickup condition automatically or manually. If the image pickup condition is automatically set, the default values, which have been first displayed, can be used without being changed, therefore, a setting end button 112 is clicked, and the setting of the image pickup condition with respect to this slide S is ended.

The automatically set image acquiring range R and the focus measuring position P may be displayed on the thumbnail image of the macro image in the list display part 101 shown in FIG. 11. Since the operator can have a look at the image pickup conditions of the slides by superimposing the image pickup condition on the thumbnail image in this way, the slides to be manually set can be easily extracted.

When the image pickup condition is manually set, a focus measuring position setting button 113 or an image acquiring range setting button 114 is clicked according to need. The image pickup condition is manually set by changing, adding, deleting, or creating the focus measuring position P or the image acquiring range R on the macro image display part 111. It is possible to again automatically set the image pickup condition by clicking an automatic setting button 115 if necessary. After the setting of the image pickup condition is ended, the setting end button 112 is clicked, so that the setting of the image pickup condition with respect to this slide S is ended.

A process corresponding to the image acquiring method performed in the image acquiring apparatus shown in FIG. 1 can be carried out by an image acquiring program for allowing the computer to execute the image acquisition processing. For example, the control unit 60 of the image acquiring apparatus can be made up of a CPU that runs each software program necessary for the image acquisition processing, a ROM in which the software programs are stored, and a RAM in which data is temporarily stored during program execution. The image acquiring apparatus and the image acquiring method mentioned above can be realized by executing a predetermined image acquiring program by the CPU in the thus formed structure.

It is possible to record the program for making the CPU execute the processes for sample image acquisition on a computer-readable storage media and distribute these. These recording media include, for example, magnetic media such as hard disks and flexible disks, optical media such as CD-ROMs and DVD-ROMs, magnetic optical media such as floptical disks, and hardware devices such as RAMs, ROMs, and semiconductor nonvolatile memories exclusively installed so as to execute or store program commands.

Effects of the image acquiring apparatus, image acquiring method, and image acquiring program according to this embodiment will be described.

In the image acquiring apparatus, the image acquiring method, and the image acquiring program mentioned above, the macro image acquiring unit 20 and the micro image acquiring unit 30 are provided for a plurality of samples S each of which is an object of image acquisition, and an image pickup condition is set while referring to a macro image that shows the whole of a sample S in the image pickup condition setting unit 71, and a high-resolution micro image is acquired. Accordingly, a high-resolution micro image of a sample, which can be used as sample image data for use in, for example, a virtual microscope, can be suitably acquired.

Further, in the control unit 60 that controls an image acquiring operation in the microscope unit 10, a semi-automatic mode is provided as a control mode that controls the acquisition of a macro image of each sample S, the setting of an image pickup condition, and the acquisition of a micro image, in which an operator makes a necessary confirmation when an image pickup condition for a micro image is set with reference to a macro image. Accordingly, even if there is, for example, dust in a slide of a sample S or there is an extra object such as notes on information concerning a biological sample, an influence exerted from such an object in setting an image pickup condition can be reliably excluded, and the image pickup condition for the sample can be correctly set.

Additionally, in the semi-automatic mode mentioned above, a sample S whose macro image has been acquired in the macro image acquiring unit 20 is placed at the standby position without moving the sample S directly to the image acquiring position in the micro image acquiring unit 30. According to this structure, as shown by the flowcharts of FIG. 8 and FIG. 9, the acquisition of the macro image of the sample S (step S202) and the setting of an image pickup condition using the macro image (S203) can be performed independently of the acquisition of a micro image that takes a certain amount of time to scan the sample S so as to acquire a high-resolution image (S204).

Therefore, after the operator completes the acquisition of a macro image with respect to each of the samples S and the setting and confirmation of an image pickup condition using the macro image, a micro image is automatically acquired by the micro image acquisition control unit 82 while referring to the set image pickup condition, therefore, there is no need to pay constant attention to the image acquiring apparatus until the acquisition of the micro image is completed, and hence an operational load imposed on the operator can be greatly reduced.

Concerning the standby position of a sample S whose macro image has been already acquired, the storage position in the sample storage unit 11 is used as the standby position in the above embodiment, and the sample S whose macro image has been acquired is again returned to the storage position. Therefore, the structure of the microscope unit 10 can be simplified. Alternatively, a sample standby unit that can put a plurality of samples S on standby may be provided independently of the sample storage unit 11.

Additionally, the image acquiring apparatus mentioned above uses the sample transfer unit 14 and the sample stage 15 that is an XY stage as sample moving means for moving each of the samples S among the storage position in the sample storage unit 11, the standby position (which is identical with the storage position in the above structure), and the respective image acquiring positions for the macro image acquiring unit 20 and the micro image acquiring unit 30. According to this structure, the acquisition of a macro image, the setting of an image pickup condition, and the acquisition of a micro image, which are performed while moving the sample S thereamong, can be suitably realized.

The micro image acquiring unit 30 includes the image pickup device 31 that is a one-dimensional sensor capable of acquiring a one-dimensional image or a TDI drive two-dimensional sensor capable of acquiring a two-dimensional image and capable of performing TDI driving, and a direction perpendicular to the longitudinal direction of an image pickup plane in the image pickup device 31 is used as a scanning direction followed when a micro image is acquired. Additionally, the micro image acquisition control unit 82 acquires a partial image while scanning a sample S in the scanning direction with the image pickup device 31, and performs control to acquire a plurality of partial images that are used as micro images by repeatedly performing an operation for acquiring the partial images two or more times while changing the image pickup position along the longitudinal direction of the image pickup plane. According to this structure, strip-like high-resolution partial images by scanning the sample S in one direction are acquired, and are combined together in the other direction, thus making a micro image of the whole of the sample, therefore, image data concerning the sample S can be suitably acquired with fully high resolution.

In the image acquiring apparatus mentioned above, in the semi-automatic mode, the image pickup condition setting unit 71 displays an image pickup condition automatically obtained in accordance with a macro image on the display device 61 in the form of default values of the image pickup condition, and an operator selects whether to use this image pickup condition or to manually reset the image pickup condition. According to this structure, the operator can manually correct or reset the image pickup condition if there is a problem, for example, if the sample S has extra objects, and if there is not such a problem, the operator can use the automatically-set image pickup condition without changes. Therefore, the operation for acquiring images of a plurality of samples S including the setting of the image pickup condition can be efficiently performed by manually setting the image pickup condition only when necessary.

Additionally, in the above image acquiring apparatus, the image pickup condition setting unit 71 sets an image acquiring range R and a focus measuring position P, which are used as image pickup conditions for a micro image, with reference to a macro image, and the micro image acquisition control unit 82 acquires focus information about a sample S based on the focus measuring position P, and performs control to acquire a micro image based on the obtained focus information and the image acquiring range R. Therefore, parameters used to acquire the micro image can be suitably set from information concerning the sample S obtained from the macro image, and hence sample image data having high resolution and being in an excellent state can be acquired.

The full-automatic mode, in addition to the semi-automatic mode, is prepared as the image-acquiring operation control mode of the control unit 60. According this structure, for image acquisition, the operator appropriately selects either the semi-automatic mode or the full-automatic mode as the control mode that controls the acquisition of a macro image with respect to each sample, the setting of an image pickup condition, and the acquisition of a micro image, and accordingly, depending on a state of each sample S of the object of image acquisition, for example, depending on the fact that a sample S has much dust or a little dust, image acquisition can be carried out according to a suitable method.

Concerning these control modes, switching between the control modes may be performed, for example, switching to the full-automatic mode may be performed during an operation in the semi-automatic mode. Preferably, both in the full-automatic mode and in the semi-automatic mode, an image acquiring operation for a sample S can be again performed if a micro image acquired with respect to the sample S has a problem after the completion of the image acquisition processing.

If exactly the same condition can be set for a plurality of slides, a condition may be manually set for one of the slides, and be then imposed on the other slides. Alternatively, a condition preset in the control unit 60 may be given to one of the slides or to the slides. Alternatively, after having acquired the images of all of the slides in the full-automatic mode, the image pickup condition may be reset in the semi-automatic mode for only the slide that has failed in image acquisition so as to acquire a new image.

The image acquiring apparatus, the image acquiring method, and the image acquiring program of the invention are not limited to those in the embodiment and structure examples, and they can be variously modified. For example, in the above embodiment, the sample S is moved between the image acquiring position for the macro image acquiring unit 20 and the image acquiring position for the micro image acquiring unit 30 by means of the sample stage 15, however, without being limited to this, a sample stage of the macro image acquiring unit 20 may be individually provided to differ from that of the micro image acquiring unit 30. In this case, the sample moving means is the sample transfer unit 14 alone. The macro image acquiring unit 20 can be structured in various manners, for example, the macro image acquiring unit 20 may be disposed at a predetermined position of the sample transfer unit 14, or may be disposed in the sample storage unit 11.

In the image acquiring apparatus according to the above embodiment, the macro image acquiring unit 20 and the micro image acquiring unit 30 are disposed independently of each other, however, the light sources and the image acquiring means may be formed as a single light source and single image acquiring means, respectively, by providing an optical system for image acquisition switchable in accordance with the acquisition of a macro image or a micro image. In this case, an optical system provided with a revolver including an objective lens for macro image acquisition and an objective lens for micro image acquisition can be mentioned as an example of the switchable optical system for image acquisition.

In the above embodiment, the image pickup device capable of acquiring a one-dimensional image or the image pickup device capable of acquiring a two-dimensional image and capable of performing TDI driving is shown as the image pickup device 31 in the micro image acquiring unit 30, however, without being limited to this, an image pickup device, such as a two-dimensional CCD camera (area sensor), may be used. In this case, a micro image of the whole of a sample S can be produced by acquiring a plurality of high-resolution tile images and combining these images together, as is disclosed by U.S. Pat. No. 6,816,606.

Additionally, in the above embodiment, the image acquiring apparatus is formed by using the transmission type microscope system, however, the present invention is not limited to this. For example, in fluorescent observation, the transmission type light source may be replaced by an epi-illumination type light source so as to form a reflection type microscope system.

The image acquiring apparatus according to the above embodiment includes (1) sample storage means for storing a plurality of samples, (2) macro image acquiring means for acquiring a macro image of the sample, (3) micro image acquiring means for acquiring a micro image while scanning the sample with higher resolution than that of the macro image, and (4) control means including macro image acquisition control means for controlling an operation to acquire the macro image by the macro image acquiring means, image pickup condition setting means for setting an image pickup condition for the micro image with reference to the macro image, and micro image acquisition control means for controlling an operation to acquire the micro image by the micro image acquiring means wherein (5) the control means has a semi-automatic mode serving as a control mode, and (6) in the semi-automatic mode, the macro image acquisition control means performs control to place each of the samples from a storage position in the sample storage means at an image acquiring position for the macro image acquiring means so as to acquire the macro image, and then performs control to place the sample at a standby position; the image pickup condition setting means sets the image pickup condition for the micro image while allowing an operator to confirm the macro image and the corresponding image pickup condition with respect to the sample the macro image of which has been acquired; and the micro image acquisition control means performs control to place the sample from the standby position and for which the image pickup condition has been set at an image acquiring position for the micro image acquiring means, and performs control to acquire the micro image with reference to the image pickup condition.

The image acquiring method (1) uses a plurality of samples stored in sample storage means as objects, and includes (2) a macro image acquiring step of acquiring a macro image of the sample, (3) a micro image acquiring step of acquiring a micro image while scanning the sample with higher resolution than that of the macro image, and (4) a control step including a macro image acquisition control step of controlling an operation to acquire the macro image by the macro image acquiring step, an image pickup condition setting step of setting an image pickup condition for the micro image with reference to the macro image, and a micro image acquisition control step of controlling an operation to acquire the micro image by the micro image acquiring step wherein (5) the control step has a semi-automatic mode serving as a control mode, and (6) in the semi-automatic mode, the macro image acquisition control step performs control to place each of the samples from a storage position in the sample storage means at an image acquiring position for the macro image acquiring step so as to acquire the macro image, and then performs control to place the sample at a standby position; the image pickup condition setting step sets the image pickup condition for the micro image while allowing an operator to confirm the macro image and the corresponding image pickup condition with respect to the sample the macro image of which has been acquired; and the micro image acquisition control step performs control to place the sample from the standby position and for which the image pickup condition has been set at an image acquiring position for the micro image acquiring step, and performs control to acquire the micro image with reference to the image pickup condition.

The image acquiring program is applied to an image acquiring apparatus including (1) sample storage means for storing a plurality of samples, (2) macro image acquiring means for acquiring a macro image of the sample, and (3) micro image acquiring means for acquiring a micro image while scanning the sample with higher resolution than that of the macro image, and includes (4) a control processing including a macro image acquisition control processing for controlling an operation to acquire the macro image by the macro image acquiring means; an image pickup condition setting processing for setting an image pickup condition for the micro image with reference to the macro image; and a micro image acquisition control processing for controlling an operation to acquire the micro image by the micro image acquiring means wherein (5) the control processing has a semi-automatic mode serving as a control mode, and (6) in the semi-automatic mode, the macro image acquisition control processing performs control to place each of the samples from a storage position in the sample storage means at an image acquiring position for the macro image acquiring means so as to acquire the macro image, and then performs control to place the sample at a standby position; the image pickup condition setting processing sets the image pickup condition for the micro image while allowing an operator to confirm the macro image and the corresponding image pickup condition with respect to the sample the macro image of which has been acquired; and the micro image acquisition control processing performs control to place the sample from the standby position and for which the image pickup condition has been set at an image acquiring position for the micro image acquiring means, and performs control to acquire the micro image with reference to the image pickup condition, and wherein the control processing is executed by a computer.

Preferably, the image acquiring apparatus includes sample moving means for moving each of the samples among the storage position, the standby position, and the respective image acquiring positions for the macro image acquiring means and the micro image acquiring means. Likewise, preferably, the image acquiring method includes a sample moving step of moving each of the samples among the storage position, the standby position, and the respective image acquiring positions for the macro image acquiring step and the micro image acquiring step. Likewise, preferably, the image acquiring program includes a sample moving process executed by a computer to move each of the samples among the storage position, the standby position, and the respective image acquiring positions for the macro image acquiring means and the micro image acquiring means. Accordingly, the acquisition of a macro image, the setting of an image pickup condition, and the acquisition of a micro image, which are performed while moving the sample among the above-mentioned positions, can be suitably realized.

Preferably, in the image acquiring apparatus, the micro image acquiring means includes an image pickup device capable of acquiring a one-dimensional image or capable of acquiring a two-dimensional image and performing TDI driving, a direction perpendicular to the longitudinal direction of an image pickup plane in the image pickup device is a scanning direction followed when a micro image is acquired, and the micro image acquisition control means performs control to acquire a partial image while scanning the sample in the scanning direction with the image pickup device and to acquire a plurality of partial images used as a micro image by repeatedly performing the partial image acquisition while changing the image pickup position along the longitudinal direction of the image pickup plane.

Likewise, preferably, in the image acquiring method, the micro image acquiring step uses an image pickup device capable of acquiring a one-dimensional image or capable of acquiring a two-dimensional image and performing TDI driving, a direction perpendicular to the longitudinal direction of an image pickup plane in the image pickup device is a scanning direction followed when a micro image is acquired, and the micro image acquisition control step performs control to acquire a partial image while scanning the sample in the scanning direction with the image pickup device and to acquire a plurality of partial images used as a micro image by repeatedly performing the partial image acquisition while changing the image pickup position along the longitudinal direction of the image pickup plane.

Likewise, preferably, in the image acquiring program, the micro image acquiring means includes an image pickup device capable of acquiring a one-dimensional image or capable of acquiring a two-dimensional image and performing TDI driving, a direction perpendicular to the longitudinal direction of an image pickup plane in the image pickup device is a scanning direction followed when a micro image is acquired, and the micro image acquisition control processing performs control to acquire a partial image while scanning the sample in the scanning direction with the image pickup device and to acquire a plurality of partial images used as a micro image by repeatedly performing the partial image acquisition while changing the image pickup position along the longitudinal direction of the image pickup plane.

According to this structure, strip-like partial images by scanning the sample in one direction with a one-dimensional sensor or a TDI-driven two-dimensional sensor are acquired with high resolution, and the partial images are combined together in another direction so as to be used as a micro image of the whole of the sample, therefore, image data concerning the sample can be suitably acquired with fully high resolution.

Preferably, in the image acquiring apparatus, in the semi-automatic mode, the image pickup condition setting means allows the display means to display an image pickup condition automatically obtained in accordance with a macro image so that an operator can select whether to use the image pickup condition or to manually reset the image pickup condition. Likewise, preferably, in the image acquiring method, in the semi-automatic mode, the image pickup condition setting step allows the display means to display an image pickup condition automatically obtained in accordance with a macro image so that an operator can select whether to use the image pickup condition or to manually reset the image pickup condition. Likewise, preferably, in the image acquiring program, in the semi-automatic mode, the image pickup condition setting processing allows the display means to display an image pickup condition automatically obtained in accordance with a macro image so that an operator can select whether to use the image pickup condition or to manually reset the image pickup condition.

According to this structure, a method can be employed in which, if there is a problem, for example, if a sample has an unnecessary object, the operator manually corrects or resets the image pickup condition, and, if there is no problem, the operator uses the automatically-set image pickup condition without changes. Thus, an operation to acquire images of a plurality of samples including the setting of an image pickup condition can be efficiently performed by manually setting the image pickup condition only when necessary.

In the image acquiring apparatus, the control means may have the full-automatic mode serving as the control mode, and, in the full-automatic mode, the macro image acquisition control means performs control to place the sample from the storage position at the image acquiring position for the macro image acquiring means so as to acquire the macro image; the image pickup condition setting means automatically sets the image pickup condition for the micro image corresponding to the macro image with respect to the sample the macro image of which has been acquired; and the micro image acquisition control means performs control to place the sample for which the image pickup condition has been set at the image acquiring position for the micro image acquiring means, and performs control to acquire the micro image with reference to the image pickup condition.

Likewise, in the image acquiring method, the control step may have the full-automatic mode serving as the control mode, and, in the full-automatic mode, the macro image acquisition control step performs control to place the sample from the storage position at the image acquiring position for the macro image acquiring step so as to acquire the macro image; the image pickup condition setting step automatically sets the image pickup condition for the micro image corresponding to the macro image with respect to the sample the macro image of which has been acquired; and the micro image acquisition control step performs control to place the sample for which the image pickup condition has been set at the image acquiring position for the micro image acquiring step, and performs control to acquire the micro image with reference to the image pickup condition.

Likewise, in the image acquiring program, the control processing may have the full-automatic mode serving as the control mode, and, in the full-automatic mode, the macro image acquisition control processing performs control to place the sample from the storage position at the image acquiring position for the macro image acquiring means so as to acquire the macro image; the image pickup condition setting processing automatically sets the image pickup condition for the micro image corresponding to the macro image with respect to the sample the macro image of which has been acquired; and the micro image acquisition control processing performs control to place the sample for which the image pickup condition has been set at the image acquiring position for the micro image acquiring means, and performs control to acquire the micro image with reference to the image pickup condition, and wherein the control processing is executed by a computer.

According to this structure, for image acquisition, an operator appropriately selects either the semi-automatic mode or the full-automatic mode as the control mode that controls the acquisition of a macro image, the setting of an image pickup condition, and the acquisition of a micro image with respect to each of the samples, therefore, through a suitable method, image acquisition can be performed in accordance with, for example, the state of the samples whose images are acquired.

Preferably, in the image acquiring apparatus, the image pickup condition setting means sets an image acquiring range and a focus measuring position that are used as image pickup conditions for a micro image while referring to a macro image, and the micro image acquisition control means performs control to acquire focus information concerning the sample based on the focus measuring position and performs control to acquire a micro image based on the obtained focus information and the image acquiring range.

Likewise, preferably, in the image acquiring method, the image pickup condition setting step sets an image acquiring range and a focus measuring position that are used as image pickup conditions for a micro image while referring to a macro image, and the micro image acquisition control step performs control to acquire focus information concerning the sample based on the focus measuring position, and performs control to acquire a micro image based on the obtained focus information and the image acquiring range.

Likewise, preferably, in the image acquiring program, the image pickup condition setting processing sets an image acquiring range and a focus measuring position that are used as image pickup conditions for a micro image while referring to a macro image, and the micro image acquisition control processing performs control to acquire focus information concerning the sample based on the focus measuring position, and performs control to acquire a micro image based on the obtained focus information and the image acquiring range.

Accordingly, parameters used to acquire a micro image can be appropriately set from information concerning the sample obtained by the macro image, and sample image data having high resolution and being in an excellent state can be acquired.

Concerning the structure of the image acquiring means in the image acquiring apparatus, the macro image acquiring means and the micro image acquiring means may be single image acquiring means, and the optical system for image acquisition may be configured to be switchable in accordance with the acquisition of a macro image or a micro image. In this case, an optical system provided with a revolver including two kinds of objective lenses can be mentioned as an example of the switchable optical system for image acquisition.

The present invention can be employed as an image acquiring apparatus, an image acquiring method, and an image acquiring program each of which is capable of efficiently performing image acquisition with respect to each of a plurality of samples.

What is claimed is:

1. An image acquiring apparatus comprising:
   a sample storage unit for storing a plurality of samples;
   macro image acquiring means for acquiring a macro image of each of the plurality of samples;
   micro image acquiring means for acquiring a micro image while scanning each of the plurality of samples with higher resolution than that of the macro image;
   a sample moving unit for moving each of the plurality of samples among a storage position in the sample storage unit, a macro image acquiring position for the macro image acquiring means, and a micro image acquiring position for the micro image acquiring means; and
   control means including macro image acquisition control means for controlling an operation to acquire the macro image by the macro image acquiring means, image pickup condition setting means for setting an image pickup condition for the micro image with reference to the macro image, and micro image acquisition control means for controlling an operation to acquire the micro image by the micro image acquiring means;
   wherein each of the plurality of samples is a sample slide containing a biological sample, and
   wherein the control means has a semi-automatic mode serving as a control mode, and
   wherein, in the semi-automatic mode,
   the macro image acquisition control means performs control to move a first sample of the plurality of samples from the storage position to the macro image acquiring position by the sample moving unit so as to acquire the macro image at the macro image acquiring position, and then performs control to move the first sample of the plurality of samples to the storage position by the sample moving unit;
   the image pickup condition setting means sets the image pickup condition of the first sample of the plurality of samples for the micro image in parallel with acquiring of the macro image of a second sample of the plurality of samples and while allowing an operator to confirm the macro image and the corresponding image pickup condition with respect to the first sample the macro image of which has been acquired; and
   the micro image acquisition control means performs control to move the first sample of the plurality of samples for which the image pickup condition has been set from the storage position to the micro image acquiring position by the sample moving unit, and performs control to acquire the micro image of the first sample of the plurality of samples at the micro image acquiring position with reference to the image pickup condition in parallel with setting the image pickup condition of a sample other than the first sample of the plurality of samples, and
   wherein the sample storage unit is provided separately from the macro image acquiring means and the micro image acquiring means; and the storage position, which is a position different from the macro image acquiring position and the micro image acquiring position, is set in the sample storage unit.

2. The image acquiring apparatus according to claim 1, wherein, in the semi-automatic mode,
   the image pickup condition setting means allows display means to display the image pickup condition automatically obtained in accordance with the macro image so that the operator selects whether to use the image pickup condition or to manually reset the image pickup condition.

3. The image acquiring apparatus according to claim 1, wherein the control means further has a full-automatic mode serving as a control mode, and
   wherein, in the full-automatic mode,
   the macro image acquisition control means performs control to move each of the plurality of samples from the storage position to the macro image acquiring position by the sample moving unit so as to acquire the macro image at the macro image acquiring position;
   the image pickup condition setting means automatically sets the image pickup condition for the micro image corresponding to the macro image with respect to each of the plurality of samples the macro image of which has been acquired; and
   the micro image acquisition control means performs control to move each of the plurality of samples for which the image pickup condition has been set to the micro image acquiring position by the sample moving unit, and performs control to acquire the micro image at the micro image acquiring position with reference to the image pickup condition.

4. The image acquiring apparatus according to claim 1, wherein the image pickup condition setting means sets an image acquiring range and a focus measuring position as the image pickup condition for the micro image while referring to the macro image; and
   the micro image acquisition control means performs control to acquire focus information concerning the first sample based on the focus measuring position, and performs control to acquire the micro image based on the obtained focus information and the image acquiring range.

5. The image acquiring apparatus according to claim 1, wherein the macro image acquiring means and the micro image acquiring means are formed as single image acquiring means, and an optical system for image acquisition is configured to be switchable in accordance with the acquisition of the macro image or the micro image.

6. An image acquiring method using a plurality of samples stored in a sample storage unit as objects, the image acquiring method comprising:
   a macro image acquiring step of acquiring a macro image of each of the plurality of samples;
   a micro image acquiring step of acquiring a micro image while scanning each of the plurality of samples with higher resolution than that of the macro image;
   a sample moving step of moving each of the plurality of samples, by using a sample moving unit, among a storage position in the sample storage unit, a macro image acquiring position for the macro image acquiring step, and a micro image acquiring position for the micro image acquiring step; and a control step including a macro image acquisition control step of controlling an operation to acquire the macro image by the macro image acquiring step, an image pickup condition setting step of setting an image pickup condition for the micro image with reference to the macro image, and a micro image acquisition control step of controlling an operation to acquire the micro image by the micro image acquiring step;

wherein each of the plurality of samples is a sample slide containing a biological sample; and wherein the control step has a semi-automatic mode serving as a control mode, and wherein, in the semi-automatic mode, the macro image acquisition control step performs control to move a first sample of the plurality of samples from the storage position to the macro image acquiring position by the sample moving unit so as to acquire the macro image at the macro image acquiring position, and then performs control to move the first sample of the plurality of samples to the storage position by the sample moving unit;

the image pickup condition setting step sets the image pickup condition of the first sample of the plurality of samples for the micro image in parallel with acquiring of the macro image of a second sample of the plurality of samples and while allowing an operator to confirm the macro image and the corresponding image pickup condition with respect to the first sample the macro image of which has been acquired; and the micro image acquisition control step performs control to move the first sample of the plurality of samples for which the image pickup condition has been set from the storage position to the micro image acquiring position by the sample moving unit, and performs control to acquire the micro image of the first sample of the plurality of samples at the micro image acquiring position with reference to the image pickup condition in parallel with setting the image pickup condition of a sample other than the first sample of the plurality of samples, and wherein the sample storage unit is provided separately from macro image acquiring means used in the macro image acquiring step and micro image acquiring means used in the micro image acquiring step; and the storage position, which is a position different from the macro image acquiring position and the micro image acquiring position, is set in the sample storage unit.

7. The image acquiring method according to claim 6, wherein, in the semi-automatic mode, the image pickup condition setting step allows a display means to display the image pickup condition automatically obtained in accordance with the macro image so that the operator selects whether to use the image pickup condition or to manually reset the image pickup condition.

8. The image acquiring method according to claim 6, wherein the control step further has a full-automatic mode serving as a control mode, and wherein, in the full-automatic mode, the macro image acquisition control step performs control to move each of the plurality of samples from the storage position to the macro image acquiring position by the sample moving unit so as to acquire the macro image at the macro image acquiring position;

the image pickup condition setting step automatically sets the image pickup condition for the micro image corresponding to the macro image with respect to each of the plurality of samples the macro image of which has been acquired; and the micro image acquisition control step performs control to move each of the plurality of samples for which the image pickup condition has been set to the micro image acquiring position by the sample moving unit, and performs control to acquire the micro image at the micro image acquiring position with reference to the image pickup condition.

9. The image acquiring method according to claim 6, wherein the image pickup condition setting step sets an image acquiring range and a focus measuring position as the image pickup condition for the micro image while referring to the macro image; and the micro image acquisition control step performs control to acquire focus information concerning the first sample based on the focus measuring position, and performs control to acquire the micro image based on the obtained focus information and the image acquiring range.

10. A non-transitory computer readable storage medium having embodied thereon an image acquiring program, being applied to an image acquiring apparatus including a sample storage unit for storing a plurality of samples, macro image acquiring means for acquiring a macro image of each of the plurality of samples, micro image acquiring means for acquiring a micro image while scanning each of the plurality of samples with higher resolution than that of the macro image, and a sample moving unit for moving each of the plurality of samples among a storage position in the sample storage unit, a macro image acquiring position for the macro image acquiring means, and a micro image acquiring position for the micro image acquiring means;

the image acquiring program comprising a control processing including a macro image acquisition control processing for controlling an operation to acquire the macro image by the macro image acquiring means; an image pickup condition setting processing for setting an image pickup condition for the micro image with reference to the macro image; and a micro image acquisition control processing for controlling an operation to acquire the micro image by the micro image acquiring means;

wherein each of the plurality of samples is a sample slide containing a biological sample, and wherein the control processing has a semi-automatic mode serving as a control mode, and wherein, in the semi-automatic mode, the macro image acquisition control processing performs control to move a first sample of the plurality of samples from the storage position to the macro image acquiring position by the sample moving unit so as to acquire the macro image at the macro image acquiring position, and then performs control to move the first sample of the plurality of samples to the storage position by the sample moving unit;

the image pickup condition setting processing sets the image pickup condition of the first sample of the plurality of samples for the micro image in parallel with acquiring of the macro image of a second sample of the plurality of samples and while allowing an operator to confirm the macro image and the corresponding image pickup condition with respect to the first sample the macro image of which has been acquired; and the micro image acquisition control processing performs control to move the first sample of the plurality of samples for which the image pickup condition has been set from the storage position to the micro image acquiring position by the sample moving unit, and performs control to acquire the micro image of the first sample of the plurality of samples at the micro image acquiring position with reference to the image pickup condition in parallel with setting the image pickup condition of a sample other than the first sample of the plurality of samples, and wherein the control processing is executed by a computer, and wherein the sample storage unit is provided separately from the macro image acquiring means and the micro image acquiring means; and the storage position, which is a position different from the macro image acquiring position and the micro image acquiring position, is set in the sample storage unit.

11. The non-transitory computer readable storage medium according to claim 10, wherein, in the semi-automatic mode, the image pickup condition setting processing allows display means to display the image pickup condition automatically obtained in accordance with the macro image so that the operator selects whether to use the image pickup condition or to manually reset the image pickup condition.

12. The non-transitory computer readable storage medium according to claim 10, wherein the control processing further has a full-automatic mode serving as a control mode, and wherein, in the full-automatic mode, the macro image acquisition control processing performs control to move each of the plurality of samples from the storage position to the macro image acquiring position by the sample moving unit so as to acquire the macro image at the macro image acquiring position;

the image pickup condition setting processing automatically sets the image pickup condition for the micro image corresponding to the macro image with respect to each of the plurality of samples the macro image of which has been acquired; and the micro image acquisition control processing performs control to move each of the plurality of samples for which the image pickup condition has been set to the micro image acquiring position by the sample moving unit, and performs control to acquire the micro image at the micro image acquiring position with reference to the image pickup condition, and wherein the control processing is executed by a computer.

13. The non-transitory computer readable storage medium according to claim 10, wherein the image pickup condition setting processing sets an image acquiring range and a focus measuring position as the image pickup condition for the micro image while referring to the macro image; and the micro image acquisition control processing performs control to acquire focus information concerning the first sample based on the focus measuring position, and performs control to acquire the micro image based on the obtained focus information and the image acquiring range.

\* \* \* \* \*